(12) United States Patent
Yushin et al.

(10) Patent No.: US 11,545,694 B2
(45) Date of Patent: Jan. 3, 2023

(54) SOLID STATE ELECTROLYTES FOR SAFE METAL AND METAL-ION BATTERIES

(71) Applicant: Sila Nanotechnologies Inc., Alameda, CA (US)

(72) Inventors: Gleb Yushin, Atlanta, GA (US); Adam Kajdos, Alameda, CA (US); Eugene Berdichevsky, Oakland, CA (US); Bogdan Zdyrko, Clemson, SC (US)

(73) Assignee: Sila Nanotechnologies, Inc., Alameda, CA (US)

( * ) Notice: Subject to any disclaimer, the term of this patent is extended or adjusted under 35 U.S.C. 154(b) by 0 days.

(21) Appl. No.: 16/719,947

(22) Filed: Dec. 18, 2019

(65) Prior Publication Data

US 2020/0127327 A1    Apr. 23, 2020

Related U.S. Application Data

(62) Division of application No. 15/380,890, filed on Dec. 15, 2016, now Pat. No. 10,522,873.

(60) Provisional application No. 62/295,980, filed on Feb. 16, 2016, provisional application No. 62/267,487, filed on Dec. 15, 2015.

(51) Int. Cl.
| | |
|---|---|
| *H01M 10/0562* | (2010.01) |
| *H01M 10/054* | (2010.01) |
| *H01M 10/052* | (2010.01) |
| *H01M 4/58* | (2010.01) |
| *H01M 4/38* | (2006.01) |
| *H01M 2/16* | (2006.01) |
| *H01M 50/431* | (2021.01) |

(52) U.S. Cl.
CPC ......... *H01M 10/0562* (2013.01); *H01M 4/38* (2013.01); *H01M 4/582* (2013.01); *H01M 10/052* (2013.01); *H01M 10/054* (2013.01); *H01M 50/431* (2021.01); *Y02T 10/70* (2013.01)

(58) Field of Classification Search
CPC .......... H01M 10/0562; H01M 10/054; H01M 10/052; H01M 4/582; H01M 4/38
See application file for complete search history.

(56) References Cited

U.S. PATENT DOCUMENTS

| | | | |
|---|---|---|---|
| 2011/0065007 A1* | 3/2011 | Kamiya | H01M 10/0562 429/322 |
| 2015/0333307 A1 | 11/2015 | Thokchom et al. | |
| 2016/0072120 A1* | 3/2016 | Mizutani | H01M 4/131 429/246 |

FOREIGN PATENT DOCUMENTS

| | | |
|---|---|---|
| CN | 1176507 C | 11/2004 |
| CN | 101494299 A | 7/2009 |
| CN | 101599558 A | 12/2009 |
| CN | 103579565 A | 2/2014 |
| CN | 104466239 A | 3/2015 |
| CN | 104756287 A | 7/2015 |

* cited by examiner

*Primary Examiner* — Osei K Amponsah
(74) *Attorney, Agent, or Firm* — Muncy, Geissler, Olds & Lowe, P.C.; Daniel Podhajny

(57) ABSTRACT

A Li or Li-ion or Na or Na-ion battery cell is provided that comprises anode and cathode electrodes, a separator, and a solid electrolyte. The separator electrically separates the anode and the cathode. The solid electrolyte ionically couples the anode and the cathode. The solid electrolyte also comprises a melt-infiltration solid electrolyte composition that is disposed at least partially in at least one of the electrodes or in the separator.

3 Claims, 15 Drawing Sheets

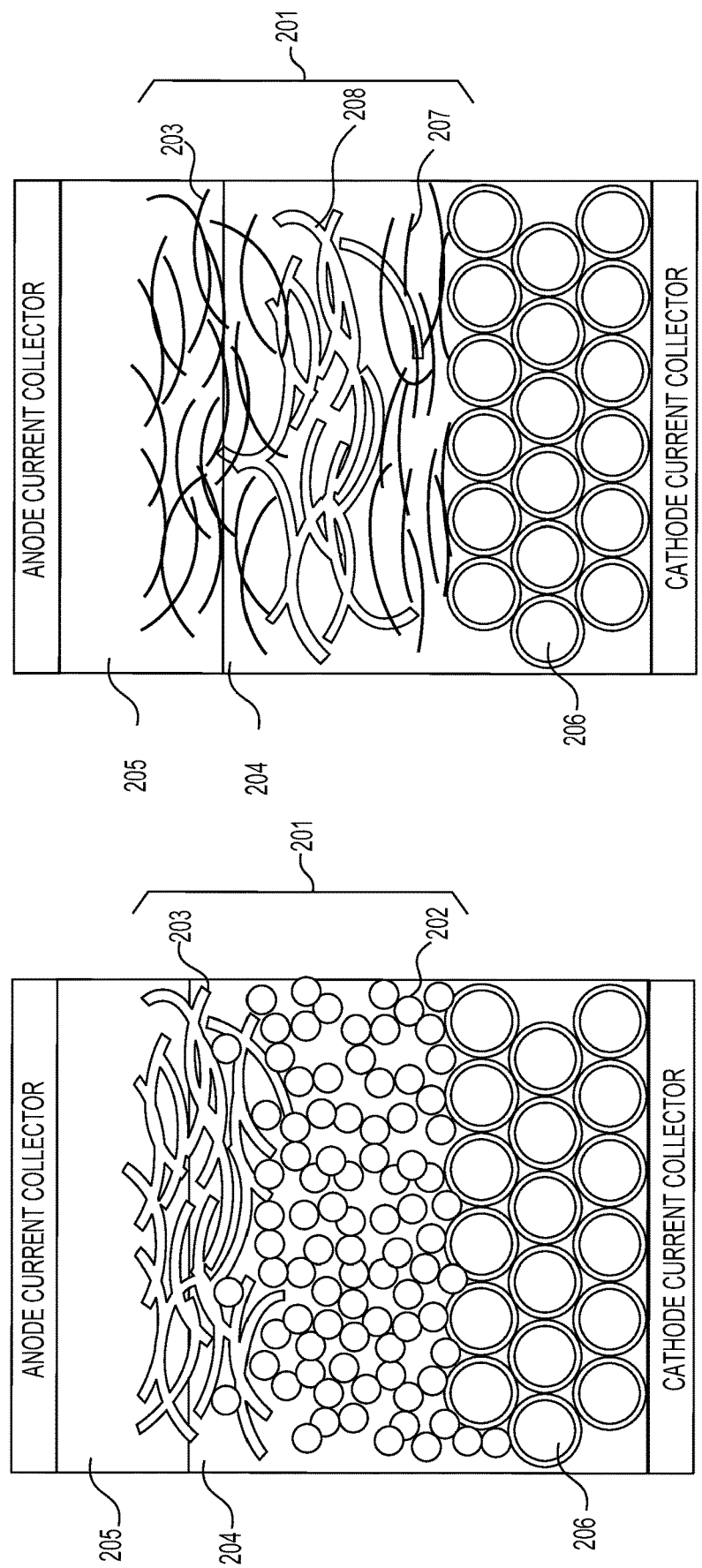

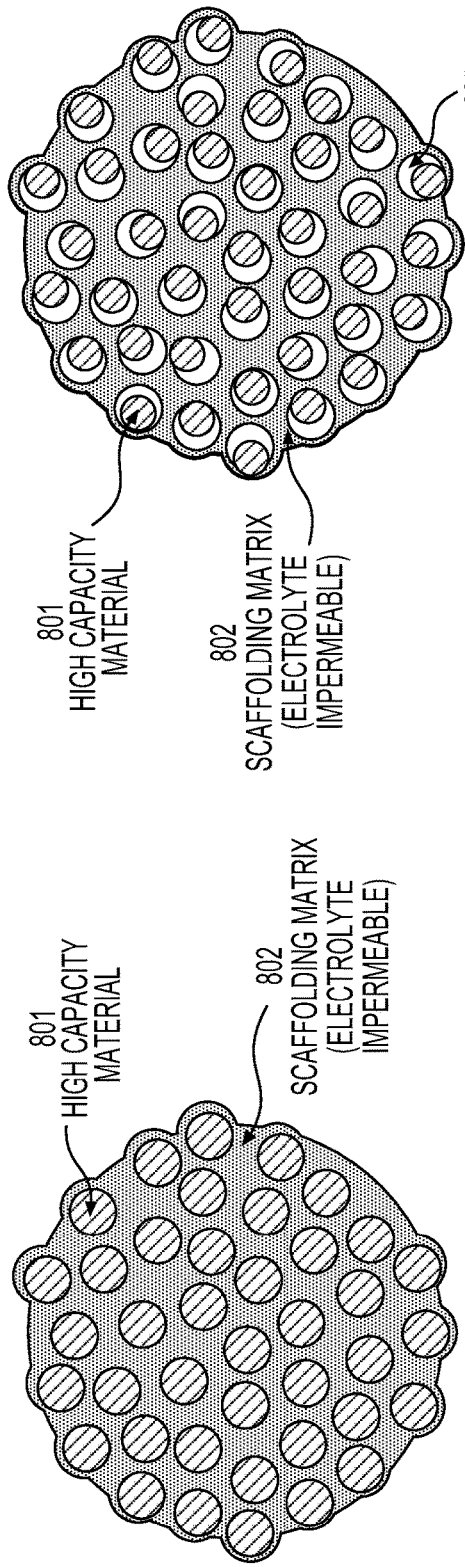
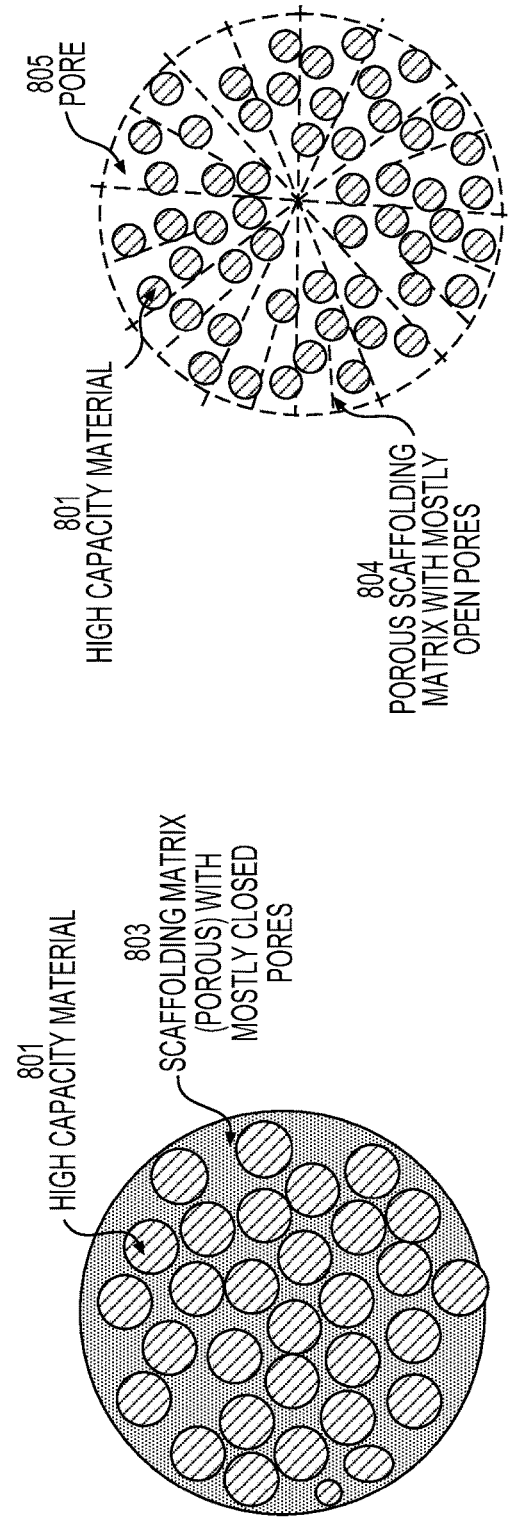

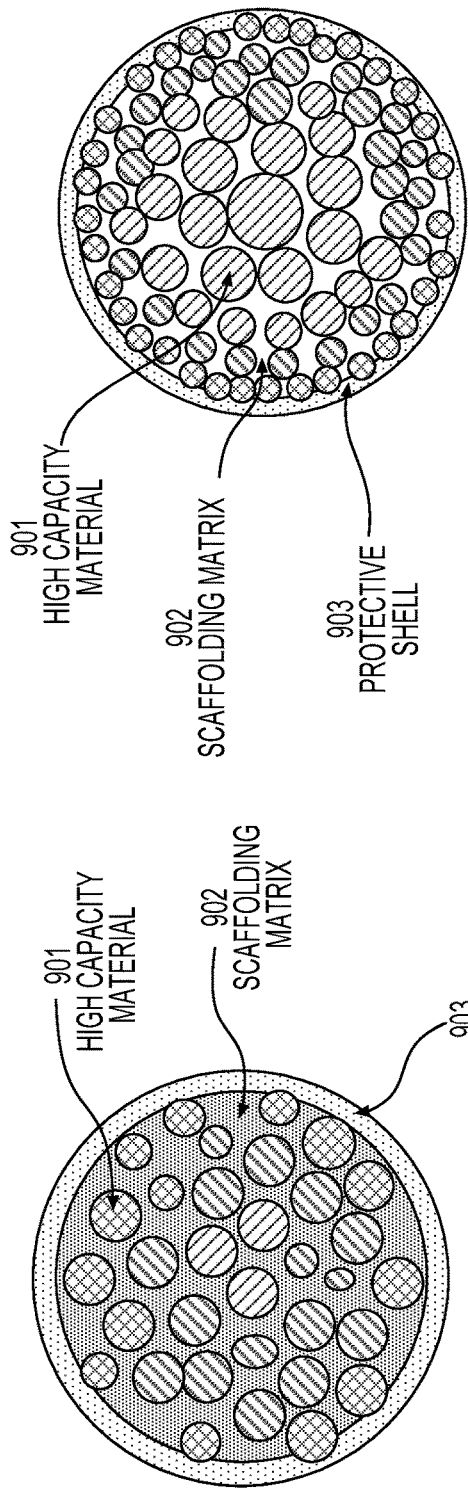
FIG. 9B
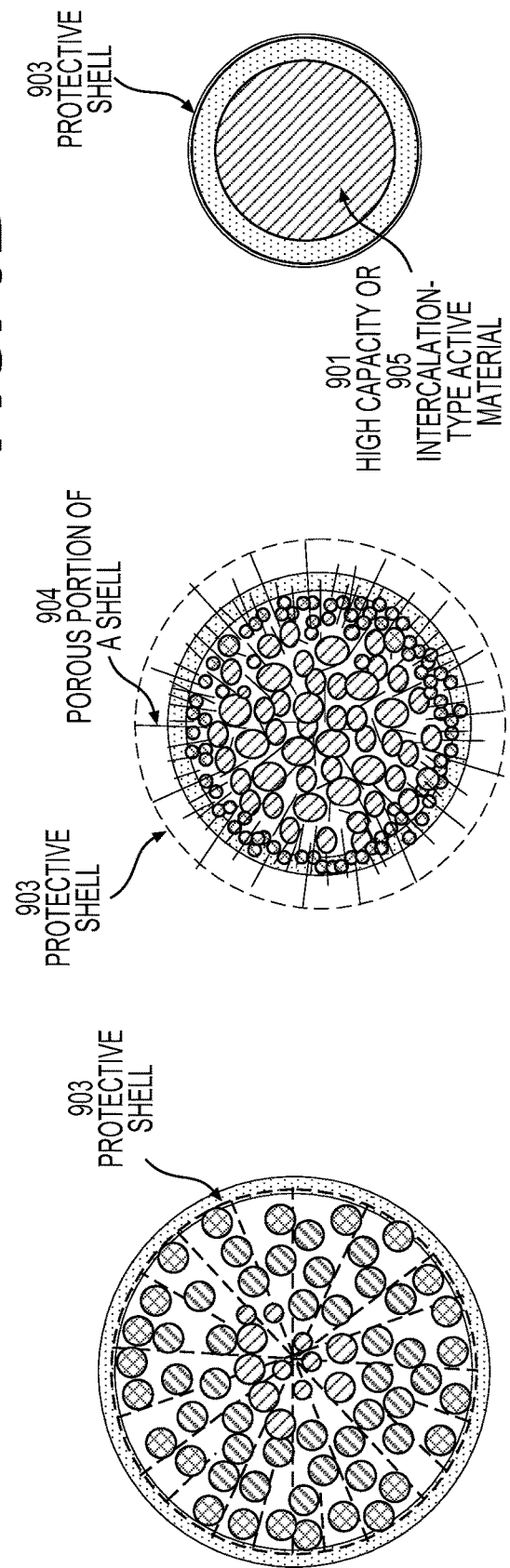
FIG. 9A
FIG. 9C
FIG. 9D
FIG. 9E

SOLID STATE ELECTROLYTES FOR SAFE METAL AND METAL-ION BATTERIES

CROSS-REFERENCE TO RELATED APPLICATIONS

The present application for patent is a Divisional of U.S. patent application Ser. No. 15/380,890, entitled "Solid State Electrolytes for Safe Metal and Metal-Ion Batteries," filed Dec. 15, 2016, which claims the benefit of U.S. Provisional Application No. 62/267,487, entitled "Solid State Electrolytes for Safe Metal and Metal-Ion Batteries with Enhanced Energy Density, Power Density and Functionality," filed Dec. 15, 2015, and U.S. Provisional Application No. 62/295,980, entitled "Low-Cost, Lightweight, Self-Healing Electrolytes for High Energy Automotive Solid State Batteries," filed Feb. 16, 2016, each of which is expressly incorporated herein by reference in its entirety.

BACKGROUND

Field

The present disclosure relates generally to energy storage devices, and more particularly to metal and metal-ion battery technology and the like.

Background

Owing in part to their relatively high energy densities, relatively high specific energy, light weight, and potential for long lifetimes, advanced rechargeable metal batteries, and rechargeable metal-ion batteries, such as lithium-ion (Li-ion) batteries, are desirable for a wide range of consumer electronics, electric vehicle, grid storage and other important applications. Similarly, primary metal and metal-ion batteries, such as primary Li batteries, are desired for a range of applications, where high energy density and/or high specific energy of batteries is needed, even if the batteries may be disposed of after a single use.

However, despite the increasing commercial prevalence of Li-ion batteries and some of the Li primary batteries, further development of these batteries is needed, particularly for potential applications in low- or zero-emission, hybrid-electrical or fully-electrical vehicles, consumer electronics, energy-efficient cargo ships and locomotives, aerospace applications, and power grids.

One desired feature of metal and metal-ion batteries for some applications is enhanced safety. It is desirable that batteries do not induce fire, even under extreme cases such as a nail penetration test. Solid electrolytes may, in principle, provide such enhanced safety. Unfortunately, the practical applications of solid state batteries with solid electrolytes are often limited by lower energy density, lower power density (particularly at low temperatures), and higher costs.

Another desired feature of metal and metal-ion batteries is enhanced energy density. Furthermore, it is typically desirable for higher energy density to not lead to a substantial reduction in cycle stability of the cell or a reduction in rate performance, which is very challenging to achieve.

For the emerging markets of flexible electronics and wearables, some flexibility of metal and metal-ion batteries is typically desired as well. Unfortunately, conventional flexible solid state metal and metal-ion batteries typically suffer from low energy density and high cost. Furthermore, bending or flexing of conventional Li-ion batteries with liquid electrolytes typically induces undesirable rapid degradation.

Accordingly, there remains a need for improved metal and metal-ion batteries, components, and other related materials and manufacturing processes.

SUMMARY

Embodiments disclosed herein address the above stated needs by providing improved battery components, improved batteries made therefrom, and methods of making and using the same.

A Li or Li-ion or Na or Na-ion battery cell is provided that comprises anode and cathode electrodes, a separator, and a solid electrolyte. The separator electrically separates the anode and the cathode. The solid electrolyte ionically couples the anode and the cathode. The solid electrolyte also comprises a melt-infiltration solid electrolyte composition that is disposed at least partially in at least one of the electrodes or in the separator.

As an example, the melt-infiltration solid electrolyte composition may have a low melting point, such as between 200° C. to 450° C.

The melt-infiltration solid electrolyte composition may comprise, for example, the following elements: Li or Na; a mixture of O with S, Se, or both; and a mixture of two of the following: I, F, Br, and Cl, with the atomic ratio of O to S or Se in the melt-infiltration solid electrolyte composition being within the range of 20:1 to 1:2. The melt-infiltration solid electrolyte composition may further comprise N, with the atomic ratio of O to N in the melt-infiltration solid electrolyte composition being within the range of 2500:1 to 1:2.5. The melt-infiltration solid electrolyte composition may further comprise P, with the atomic ratio of O to P in the melt-infiltration solid electrolyte composition being within the range of 2500:1 to 1:2.5. The melt-infiltration solid electrolyte composition may further comprise at least one of the following metals: La, Ce, Pr, Eu, Yb, Nd, Sm, Gd, Si, Sn, As, Sb, In, Mo, Nb, Zr, Y, Hf, Ta, W, B, Cs, Ba, Sr, Fe, V, Mn, Tl, or Al; with the atomic ratio of Li or Na to the combination of all other metals in the melt-infiltration solid electrolyte composition of the electrolyte being within the range of 5000:1 to 1:3.

The melt-infiltration solid electrolyte composition may comprise at least two metals, with one of the metals being selected from the group consisting of La, Ce, Eu, and Yb. The melt-infiltration solid electrolyte composition may exhibit an ionic conductivity in the range of 0.00005 S/cm to 0.05 S/cm at 30° C.

The anode may comprise, for example, an active material that comprises Si, Ge, Sb, Sn, Al, or P. The anode may also comprise Li metal. Here, the cell may further comprise an interlayer disposed at the interface between the Li metal and the solid electrolyte. The Li metal anode may further comprise metal or carbon in the form of particles, fibers, foam, fabric, or paper. The cathode may comprise, for example, an active material that comprises $CuF_2$, $FeF_3$, LiF, Fe, or Cu.

At least one of the electrodes may comprise a conversion material in the form of composite particles. At least one of the electrodes may comprise active electrode particles, with the active electrode particles being enclosed in one or more shells that separate the electrode particles from direct contact with the solid electrolyte. In some designs, the shells may comprise pores.

The separator may comprise, for example, one or more metal oxides. As an example, the separator may comprise aluminum oxide, magnesium oxide, or zirconium oxide, in the form of fibers or nanofibers.

At least one of the electrodes may comprise a current collector that comprises two or more metal foils and a conductive lubricant between the metal foils.

The melt-infiltration solid electrolyte composition may be melt-infiltrated into the cell at temperatures below 400° C. The melt-infiltration solid electrolyte composition may be formed without any H-containing constituents as an electrolyte precursor.

BRIEF DESCRIPTION OF THE DRAWINGS

The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

FIGS. 2A-2B illustrate example separator membranes for use in the disclosed solid state batteries.

FIGS. 8A-8D and 9A-9E illustrate example composite active materials that may be used in the construction of electrodes for the disclosed solid state batteries.

DETAILED DESCRIPTION

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

While the description below may describe certain examples in the context of Li and Li-ion batteries (for brevity and convenience, and because of the current popularity of Li technology), it will be appreciated that various aspects may be applicable to other rechargeable and primary, metal and metal-ion batteries (such as Na and Na-ion, Mg and Mg-ion, K and K-ion, Cs and Cs-ion, Ca and Ca-ion, and others). Further, while the description below may also describe certain examples of the material formulations in a Li-free (e.g., charged) state, it will be appreciated that various aspects may be applicable to Li-containing electrodes (e.g., in either a partially or fully discharged state).

Some aspects of the present disclosure (including but not limited to those related to enhancing the flexibility of cells and to the stable use of high voltage active cathode materials) may be applicable to various cells (including Li-ion cells) comprising liquid electrolytes.

Figure 1:
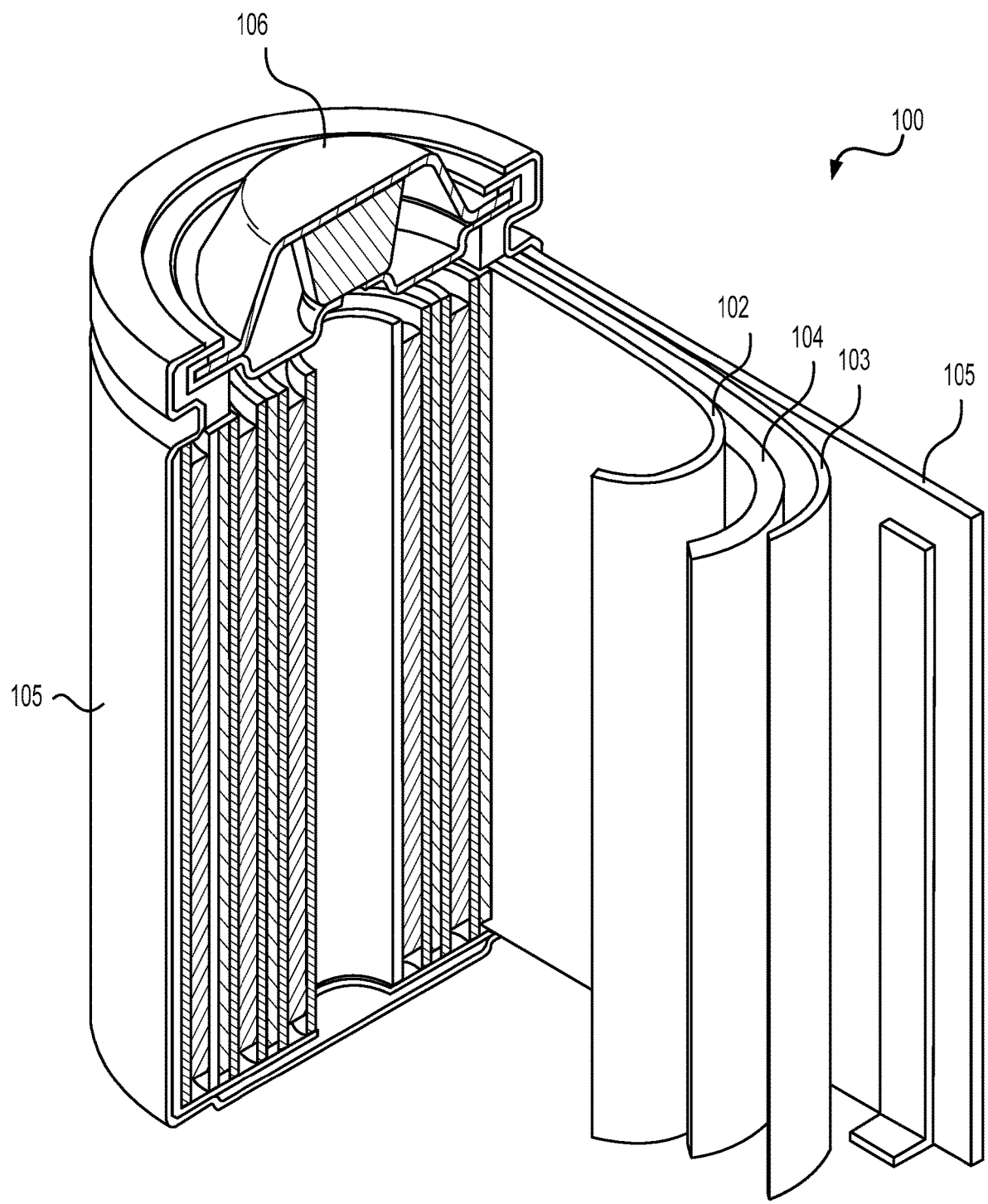
FIG. 1 illustrates an example metal-ion (e.g., Li-ion) battery in which the components, materials, methods, and other techniques described herein, or combinations thereof, may be applied according to various embodiments.

FIG. 1 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (not labeled separately) impregnating the separator 104, a battery case 105, and a sealing member 106 sealing the battery case 105.

Solid electrolytes may provide some advantages for Li and Li-ion cells, such as stability against oxidation at high cathode potentials, reduced undesirable side reactions between the cathode and electrolyte, reduced undesirable side reactions between the anode and electrolyte, and enhanced safety. Examples of solid ceramic electrolytes include sulfide-based electrolytes (such as $Li_2S$—$P_2S_5$, $Li_2S$—$Ga_2S_3$—$GeS_2$, $Li_2S$—$SiS_2$, etc.), halide-based electrolytes, oxide-based electrolytes (such as Li—La—Ti—O garnet, Li—La—Ta—O garnet, Li—Si—O glass, Li—Ge—O glass, $Li_9SiAlO_8$, etc.), mixed sulfide-oxide electrolytes (such as $Li_2S$—$SiS_2$—$Li_4SiO_4$, LiI—$La_2O_2S$—$La_2O_2S_2$, etc.), oxy-chloride and oxy-hydro-chloride electrolytes (such as $Li_3OCl$ electrolyte, $Li_2OHCl$ electrolyte, $Li_3(OH)_2Cl$ electrolyte, etc.) and others.

Conventional solid electrolytes and solid state Li or Li-ion batteries typically suffer from various limitations, such as (i) low ionic conductivity (and thus low rate performance of solid cells), particularly at low temperatures (e.g., below around 0° C.); (ii) low practically-achievable energy density (e.g., due to the typically used milling procedure for the fabrication of electrodes with solid electrolytes, which requires excessive content of conductive additives and electrolyte for achieving reasonable rate performance and high capacity utilization); (iii) large thickness (typically above 50 microns) of the electrolyte (separator) membranes (e.g., due to the typical formation of such solid membranes by sintering solid electrolyte powders), which increases the volume occupied by the inactive material, thus increasing cell cost and reducing cell energy density; (iv) the brittle nature of the ceramic solid electrolytes and solid state batteries, which limits their applications and life; (v) the lack of flexibility in typical solid state batteries with solid ceramic electrolytes, which limits their applications and life; (vi) typically rather high interface resistance between the solid electrolyte and the electrode materials (e.g., anode or cathode, or both), which limits their rate performance and temperature of efficient operation; (vii) often high reactivity of the solid electrolytes with many typically used electrode materials and current collectors (particularly for sulfide and chloride-comprising electrolytes), which may induce corrosion and other undesirable reactions during heating of the cell during fabrication or even during use at elevated temperatures (e.g., typically above around 50° C.); and (viii) penetration of solid electrolytes by metal dendrites (e.g., Li dendrites in the case of Li metal or Li-ion batteries) during cycling, which may induce self-discharge, battery failure and even safety hazards. In addition, conventional solid state Li or Li-ion batteries cannot be used with conversion-type (including alloying-type) active electrode materials (due to the undesirable interactions with such materials and due to the volume changes in such active materials, which cannot be accommodated by solid electrolytes in typical cells). Furthermore, a majority of the solid state Li-ion batteries cannot utilize graphite (or, more generally, carbon-based) anodes due to the poor interface (high resistance). Similarly, conventional solid state Li-ion batteries cannot be used with high voltage (greater than around 4 V vs. Li/Li+) cathode materials (e.g., with high voltage polyanion cathodes). Furthermore, many solid state batteries require assembling of electrodes or electrolyte membranes (or both) in dry or even oxygen-free environments, which is expensive and often not practical.

The present disclosure offers routes to overcome (or significantly reduce) the above limitations.

One aspect of the present disclosure includes advanced electrolyte compositions, which provide favorable performance of solid state metal and metal-ion (such as Li and Li-ion) battery cells. Examples are provided below for advanced electrolyte compositions for Li and Li-ion batteries. However, similar compositions for Na and Na-ion batteries, K and K-ion batteries, Cs and Cs-ion batteries are disclosed, where Li in the compositions below is substituted with the corresponding metal (K, Cs, or Na). In case of Ca, Ca-ion, Mg, Mg-ion and other metal and metal-ion batteries the composition may be adjusted considering different valence of the alkaline earth metal (e.g., 0.5 Ca or 0.5 Mg is needed to replace 1 Li in the corresponding formulas because the valence of Ca and Mg is +2, while the valence of Li is +1)

The following solid electrolyte composition is disclosed:

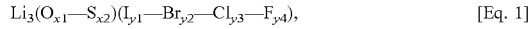
$$Li_3(O_{x1}-S_{x2})(I_{y1}-Br_{y2}-Cl_{y3}-F_{y4}), \quad [\text{Eq. 1}]$$

where x1+x2=1, x2>0, y1+y2+y3+y4=1, and y1+y4>0, and where "$A_{a1}$-$B_{b1}$" symbolizes the presence of two components (e.g., two elements), such as element A and element B in the electrolyte with relative atomic fractions of a1 (for element A) and b1 (for element B); in the formula described above Li is lithium, O is oxygen, S is sulfur, selenium, or tellurium or their mixture, I is iodine, Br is bromine, and F is fluorine. In some applications, it may be advantageous for this electrolyte to comprise at least three different halides. In some designs, it may be advantageous for this electrolyte to exhibit atomic ratio of O:S below 20:1 (which means x1:x2<20 or x2:x1>0.05). In some designs, it may be advantageous for this electrolyte to exhibit atomic ratio of O:S above 1:2 (which means x1:x2>0.5 or x2:x1<2). In some designs, it may be advantageous for this electrolyte to exhibit an atomic ratio of F to all other halides (F: sum of (Br, Cl, and I)) above 1:100 (which means y4:(y1+y2+y3)>0.01), or in some cases above 1:20. In some designs, it may be advantageous for this electrolyte composition (relative fraction of constituents) to be tuned in such a way as for the electrolyte to exhibit ionic conductivity in the range from around 0.05 S cm$^{-1}$ to around 0.00005 S cm$^{-1}$ at 30° C. A lower ionic conductivity may undesirably limit the acceptable rate performance of cells comprising such electrolytes for some applications. A higher ionic conductivity may limit electrochemical stability of such electrolytes and lead to undesirably high electron conductance. In some designs, it may be advantageous for this electrolyte composition (relative fraction of constituents) to be tuned in such a way as for the electrolyte to exhibit a melting point below 450° C. (or preferably below 400° C., or more preferably below 350° C.) (e.g., between 200° C. and 450° C.) (e.g., between 200° C. and 450° C.).

The following solid electrolyte composition is also disclosed:

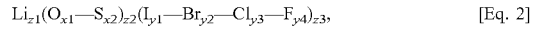
$$Li_{z1}(O_{x1}-S_{x2})_{z2}(I_{y1}-Br_{y2}-Cl_{y3}-F_{y4})_{z3}, \quad [\text{Eq. 2}]$$

where x1+x2=1; x2>0; y1+y2+y3+y4=1 and y1+y4>0; and z1=(z2)*2+(z3), 3<z1<12, 0<z2<6, and 0<z3<12. In some applications, it may be advantageous for this electrolyte to comprise at least three different halides. In some applications, it may be advantageous for S in this electrolyte to be a mixture of sulfur with either selenium or tellurium with the atomic fraction of non-sulfur in S to exceed 0.1%. In some designs, it may be advantageous for this electrolyte to exhibit an atomic ratio of O:S below 20:1 (which means x1:x2<20 or x2:x1>0.05). In some designs, it may be advantageous for this electrolyte to exhibit an atomic ratio of O:S above 1:2 (which means x1:x2>0.5 or x2:x1<2). In some designs, it may be advantageous for this electrolyte to exhibit an atomic ratio of F to all other halides (F: sum of (Br, Cl, and I)) above 1:100 (which means y4:(y1+y2+y3)>0.01), or in some cases above 1:20. In some designs, it may be advantageous for this electrolyte to exhibit an atomic ratio of I to all other halides (I: sum of (Br, Cl, and F)) above 1:1000 (which means y1:(y4+y2+y3)>0.001). In some designs, it may be advantageous for this electrolyte composition to be tuned in such a way as for the electrolyte to exhibit ionic conductivity in the range from around 0.05 S cm$^{-1}$ to around 0.00005 S cm$^{-1}$ at 30° C. A lower ionic conductivity may undesirably limit the acceptable rate performance of cells comprising such electrolytes for some applications. A higher ionic conductivity may limit electrochemical stability of such electrolytes and lead to undesirably high electron conductance. In some designs, it may be advantageous for this electrolyte composition to be tuned in such a way as for the electrolyte to exhibit a melting point below 450° C. (or preferably below 400° C., or more preferably below 350° C.) (e.g., between 200° C. and 450° C.).

The following solid electrolyte composition is also disclosed:

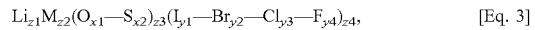
$$Li_{z1}M_{z2}(O_{x1}-S_{x2})_{z3}(I_{y1}-Br_{y2}-Cl_{y3}-F_{y4})_{z4}, \quad [\text{Eq. 3}]$$

where M is either a metal or a semimetal (or a mixture of metals, a mixture of semimetals, or a mixture of metal(s) and semimetals) with the effective (or average) valence m, with M selected from the group I including (silicon (Si), boron (B), tin (Sn), germanium (Ge), arsenic (As), antimony (Sb), gallium (Ga), bismuth (Bi), indium (In), molybdenum (Mo), niobium (Nb), zirconium (Zr), yttrium (Y), hafnium (Hf), tantalum (Ta), and tungsten (W)); x1+x2=1; x2>0; y1+y2+y3+y4=1; z1+(z2)*m=(z3)*2+(z4), 3<z1<12, 0<z2<24, 0<z3<24, and 0<z4<72. In some applications, M in Eq. 3 may be selected from the group II including (hydrogen (H), potassium (K), cesium (Cs), sodium (Na), magnesium (Mg), calcium (Ca), barium (Ba), strontium (Sr), copper (Cu), iron (Fe), vanadium (V), manganese (Mn), aluminum (Al), and thallium (Tl)). In some applications, M may be a mixture of elements, where at least one element is selected from the group I and at least one element is selected from the group II. In some applications, it may be advantageous for this electrolyte of Eq. 3 to comprise at least two different metals/semimetals (in addition to Li) in the mixture, where at least two of such different metals/semimetals either exhibit different valences or substantially (e.g., by greater than 10%) different ionic radii. In some applications, it may be advantageous for this electrolyte to comprise at least three different metals/semimetals (in addition to Li) in the mixture, where at least two of the different metals/semimetals exhibit different valences. In some applications, it may be advantageous for the z2:z1 ratio in this electrolyte to be less than 3 and more than 0.0001. In some applications, it may be advantageous for the z4:z1 ratio in this electrolyte to be more than 0.1. In some applications, it may be advantageous for this electrolyte to comprise at least three different halides. In some designs, it may be advantageous for this electrolyte to exhibit an atomic ratio of O:S below 20:1 (which means x1:x2<20 or x2:x1>0.05). In some designs, it may be advantageous for this electrolyte to exhibit an atomic ratio of O:S above 1:2 (which means x1:x2>0.5 or x2:x1<2). In some designs, it may be advantageous for this electrolyte to exhibit an atomic ratio of F to all other halides (F: sum of (Br, Cl, and I)) above 1:100 (which means y4:(y1+y2+y3)>0.01), or in some cases, above 1:20. In some designs, it may be advantageous for this electrolyte to exhibit an atomic ratio of I to all other halides (I: sum of (Br, Cl, and F)) above 1:1000 (which means y1:(y4+y2+y3)>0.001). In some designs, it may be advantageous for this electrolyte composition to be tuned in such a way as for the electrolyte to exhibit ionic conductivity in the range from around 0.05 S cm$^{-1}$ to around 0.00005 S cm$^{-1}$ at 30° C. A lower ionic conductivity may undesirably limit the acceptable rate performance of cells comprising such electrolytes for some applications. A higher ionic conductivity may limit electrochemical stability of such electrolytes and lead to undesirably high electron conductance. In some designs, it may be advantageous for this electrolyte composition to be tuned in such a way as for the electrolyte to exhibit a melting point below 450° C. (or preferably below 400° C., or more preferably below 350° C.) (e.g., between 200° C. and 450° C.).

The following solid electrolyte composition is also disclosed:

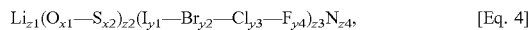

$$Li_{z1}(O_{x1}-S_{x2})_{z2}(I_{y1}-Br_{y2}-Cl_{y3}-F_{y4})_{z3}N_{z4},\qquad [Eq.\ 4]$$

where x1+x2=1; y1+y2+y3+y4=1 and y1+y4>0; z1=(z2)*2+z3+(z4)*3, 3<z1<84, 0<z2<18, 0<z3<12, and 0<z4<12; and N is nitrogen. In some applications, it may be advantageous for this electrolyte to comprise at least three different halides. In some applications, it may be advantageous for S in this electrolyte to be a mixture of sulfur with either selenium or tellurium with the atomic fraction of non-sulfur in S to exceed 0.1% (or 0.001). In some designs, it may be advantageous for this electrolyte to exhibit an atomic ratio of O:S below 20:1 (which means x1:x2<20 or x2:x1>0.05). In some designs, it may be advantageous for this electrolyte to exhibit an atomic ratio of O:S above 1:2 (which means x1:x2>0.5 or x2:x1<2). In some designs, it may be advantageous for this electrolyte to exhibit an atomic ratio of F to all other halides (F: sum of (Br, Cl, and I)) above 1:100 (which means y4:(y1+y2+y3)>0.01), or in some cases, above 1:20. In some designs, it may be advantageous for this electrolyte to exhibit an atomic ratio of I to all other halides (I: sum of (Br, Cl, and F)) above 1:1000 (which means y1:(y4+y2+y3)>0.001). In some designs, it may be advantageous for the ratio of z2 to z4 in this electrolyte (z2:z4) to be less than 5000:1 and higher than 1:5. In some designs, it may be advantageous for this electrolyte composition to be tuned in such a way as for the electrolyte to exhibit ionic conductivity in the range from around 0.05 S cm$^{-1}$ to around 0.00005 S cm$^{-1}$ at 30° C. A lower ionic conductivity may undesirably limit the acceptable rate performance of cells comprising such electrolytes for some applications. A higher ionic conductivity may limit electrochemical stability of such electrolytes and lead to undesirably high electron conductance. In some designs, it may be advantageous for this electrolyte composition to be tuned in such a way as for the electrolyte to exhibit a melting point below 450° C. (or preferably below 400° C., or more preferably below 350° C.) (e.g., between 200° C. and 450° C.).

The following solid electrolyte composition is also disclosed:

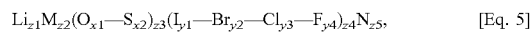

$$Li_{z1}M_{z2}(O_{x1}-S_{x2})_{z3}(I_{y1}-Br_{y2}-Cl_{y3}-F_{y4})_{z4}N_{z5},\qquad [Eq.\ 5]$$

where M is either a metal or a semimetal (or a mixture of metals, a mixture of semimetals, or a mixture of metal(s) and semimetals) with the effective (average) valence m, with M selected from the above-discussed group I or group II, or both, together comprising (Si, Sn, Ge, As, Sb, Ga, Bi, In, Mo, Nb, Zr, Y, Hf, Ta, W, H, K, B, Cs, Na, Mg, Ca, Ba, Sr, Cu, Fe, V, Mn, Tl, and Al), N is nitrogen, O is oxygen, S is sulfur, selenium, or tellurium, or their mixture; where x1+x2=1; y1+y2+y3+y4=1; z1+(z2)*m=(z3)*2+z4+(z5)*3; 1<z1<24, 0<z2<8, 0<z3<12, and 0<z4<24, 0<z5<36. In some applications, it may be advantageous for this electrolyte of Eq. 5 to comprise at least two different metals/semimetals (in addition to Li) in the mixture, where at least two of such different metals/semimetals either exhibit different valences or substantially (e.g., by greater than 10%) different ionic radii. In some applications, it may be advantageous for this electrolyte to comprise at least three different metals/semimetals (in addition to Li) in the mixture, where at least two of the different metals/semimetals exhibit different valences. In some applications, it may be advantageous for the z2:z1 ratio in this electrolyte to be less than 3 and more than 0.0001. In some applications, it may be advantageous for the z4:z1 ratio in this electrolyte to be more than 0.1. In some applications, it may be advantageous for the z5:z3 ratio in this electrolyte to be more than 0.0001 and less than 2. In some applications, it may be advantageous for this electrolyte to comprise at least two different halides. In some applications, it may be advantageous for S in this electrolyte to be a mixture of sulfur with either selenium or tellurium, with the atomic fraction of non-sulfur in S to exceed 0.1% (or 0.001). In some designs, it may be advantageous for this electrolyte to exhibit an atomic ratio of O:S below 20:1. In some designs, it may be advantageous for this electrolyte to exhibit an atomic ratio of O:S above 1:2. In some designs, it may be advantageous for this electrolyte to exhibit an atomic ratio of F to all other halides (F: sum of (Br, Cl, and I)) above 1:100, or in some cases above 1:20. In some designs, it may be advantageous for this electrolyte to exhibit an atomic ratio of I to all other halides (I: sum of (Br, Cl, and F)) above 1:1000. In some designs, it may be advantageous for this electrolyte composition to be tuned in such a way as for the electrolyte to exhibit ionic conductivity in the range from around 0.05 S cm$^{-1}$ to around 0.00005 S cm$^{-1}$ at 30° C. A lower ionic conductivity may undesirably limit the acceptable rate performance of cells comprising such electrolytes for some applications. A higher ionic conductivity may limit electrochemical stability of such electrolytes and lead to undesirably high electron conductance. In some designs, it may be advantageous for this electrolyte composition to be tuned in such a way as for the electrolyte to exhibit a melting point below 450° C. (or preferably below 400° C., or more preferably below 350° C.) (e.g., between 200° C. and 450° C.).

The following solid electrolyte composition is also disclosed:

$$Li_{z1}M_{z2}Ln_{z3}(O_{x1}-S_{x2})_{z4}(I_{y1}-Br_{y2}-Cl_{y3}-F_{y4})_{z5}N_{z6},  \quad [Eq.\ 6]$$

where M is either a metal or a semimetal (or a mixture of metals, a mixture of semimetals, or a mixture of metal(s) and semimetals) with the effective (average) valence m, with M selected from the above-discussed group I or group II, or both, together including (Si, Sn, Ge, As, Sb, Ga, Bi, In, Mo, Nb, Zr, Y, Hf, Ta, W, H, K, B, Cs, Na, Mg, Ca, Ba, Sr, Cu, Fe, V, Mn, Tl, and Al), N is nitrogen, O is oxygen, S is sulfur, selenium, or tellurium, or their mixture, Ln is a lanthanide (such as lanthanum (La), cerium (Ce), neodymium (Nd), samarium (Sm), or gadolinium (Gd), among others or their mixtures); and where $x1+x2=1$; $y1+y2+y3+y4=1$; $z1+(z2)*m+(z3)*3=(z4)*2+z5+(z6)*3$; and $1<z1<24$, $0 \le z2<8$, $0<z3<8$, $0<z4<12$, $0<z5<24$, and $0 \le z6<8$. In some applications, it may be advantageous for this electrolyte of Eq. 6 to comprise at least two different metals/semimetals (in addition to Li) in the mixture, where at least two of such different metals/semimetals either exhibit different valences or substantially (e.g., by greater than 10%) different ionic radii. In some applications, it may be advantageous for this electrolyte to comprise at least three different metals/semimetals (in addition to Li) in the mixture, where at least two of the different metals/semimetals exhibit different valences. In some applications, it may be advantageous for the z2:z1 ratio in this electrolyte to be less than 3 and higher than 0.0001. In some applications, it may be advantageous for the z3:z1 ratio in this electrolyte to be less than 3 and higher than 0.0001. In some applications, it may be advantageous for the z4:z1 ratio in this electrolyte to be less than 3 and higher than 0.1. In some applications, it may be advantageous for the z5:z1 ratio in this electrolyte to be more than 0.1. In some applications, it may be advantageous for the z6:z4 ratio in this electrolyte to be more than 0.0001 and less than 2. In some applications, it may be advantageous for this electrolyte to comprise at least two different halides. In some applications, it may be advantageous for S in this electrolyte to be a mixture of sulfur with either selenium or tellurium with the atomic fraction of non-sulfur in S to exceed 0.1% (or 0.001). In some designs, it may be advantageous for this electrolyte to exhibit an atomic ratio of O:S below 20:1. In some designs, it may be advantageous for this electrolyte to exhibit an atomic ratio of O:S above 1:2. In some designs, it may be advantageous for this electrolyte to exhibit an atomic ratio of F to all other halides (F: sum of (Br, Cl and I)) above 1:100, or in some cases, above 1:20. In some designs, it may be advantageous for this electrolyte to exhibit an atomic ratio of I to all other halides (I: sum of (Br, Cl, and F)) above 1:1000. In some designs, it may be advantageous for this electrolyte composition to be tuned in such a way as for the electrolyte to exhibit ionic conductivity in the range from around 0.05 S cm$^{-1}$ to around 0.00005 S cm$^{-1}$ at 30° C. A lower ionic conductivity may undesirably limit the acceptable rate performance of cells comprising such electrolytes for some applications. A higher ionic conductivity may limit electrochemical stability of such electrolytes and lead to undesirably high electron conductance. In some designs, it may be advantageous for this electrolyte composition to be tuned in such a way as for the electrolyte to exhibit a melting point below 450° C. (or preferably below 400° C., or more preferably below 350° C.) (e.g., between 200° C. and 450° C.).

The following solid electrolyte composition is also disclosed:

$$Li_{z1}(O_{x1}-S_{x2})_{z2}(I_{y1}-Br_{y2}-Cl_{y3}-F_{y4})_{z3}P_{z4},  \quad [Eq.\ 7]$$

where $x1+x2=1$; $y1+y2+y3+y4=1$ and $y1+y4>0$; $z1+(z4)*3=(z2)*2+z3$ or $z1+(z4)*5=(z2)*2+z3$, $1<z1<24$, $0<z2<18$, $0<z3<24$, and $0<z4<8$; and P is phosphorus. In some applications, it may be advantageous for this electrolyte to comprise at least three different halides. In some applications, it may be advantageous for S in this electrolyte to be a mixture of sulfur with either selenium or tellurium with the atomic fraction of non-sulfur in S to exceed 0.1% (or 0.001). In some designs, it may be advantageous for this electrolyte to exhibit an atomic ratio of O:S below 20:1 (which means $x1:x2<20$ or $x2:x1>0.05$). In some designs, it may be advantageous for this electrolyte to exhibit an atomic ratio of O:S above 1:2 (which means $x1:x2>0.5$ or $x2:x1<2$). In some designs, it may be advantageous for this electrolyte to exhibit an atomic ratio of F to all other halides (F: sum of (Br, Cl, and I)) above 1:100 (which means $y4:(y1+y2+y3)>0.01$), or in some cases, above 1:20. In some designs, it may be advantageous for this electrolyte to exhibit an atomic ratio of I to all other halides (I: sum of (Br, Cl, and F)) above 1:1000 (which means $y1:(y4+y2+y3)>0.001$). In some designs, it may be advantageous for the ratio of z2 to z4 in this electrolyte (z2:z4) to be less than 5000:1 and higher than 1:5. In some designs, it may be advantageous for this electrolyte composition to be tuned in such a way as for the electrolyte to exhibit ionic conductivity in the range from around 0.05 S cm$^{-1}$ to around 0.00005 S cm$^{-1}$ at 30° C. A lower ionic conductivity may undesirably limit the acceptable rate performance of cells comprising such electrolytes for some applications. A higher ionic conductivity may limit electrochemical stability of such electrolytes and lead to undesirably high electron conductance. In some designs, it may be advantageous for this electrolyte composition to be tuned in such a way as for the electrolyte to exhibit a melting point below 450° C. (or preferably below 400° C., or more preferably below 350° C.) (e.g., between 200° C. and 450° C.).

The following solid electrolyte composition is also disclosed:

$$Li_{z1}M_{z2}(O_{x1}-S_{x2})_{z3}(I_{y1}-Br_{y2}-Cl_{y3}-F_{y4})_{z4}P_{z5},  \quad [Eq.\ 8]$$

where M is either a metal or a semimetal (or a mixture of metals or a mixture of semimetals or a mixture of metal(s) and semimetals) with the effective (average) valence m, with M selected from the above-discussed group I or group II, or both, together including (Si, Sn, Ge, As, Sb, Ga, Bi, In, Mo, Nb, Zr, Y, Hf, Ta, W, H, K, B, Cs, Na, Mg, Ca, Ba, Sr, Cu, Fe, V, Mn, Tl, and Al), P is phosphorus, O is oxygen, and S is sulfur, selenium, or tellurium, or their mixture; where $x1+x2=1$; $y1+y2+y3+y4=1$; and $z1+(z2)*m+(z4)*3=(z3)*2+z4$ or $z1+(z2)*m+(z4)*5=(z3)*2+z4$, where $1<z1<24$, $0<z2<8$, $0<z3<12$, $0<z4<24$, and $0<z5<8$. In some applications, it may be advantageous for this electrolyte to comprise at least two different metals/semimetals (in addition to Li) in the mixture, where at least two of such different metals/semimetals either exhibit different valences or substantially (e.g., by greater than 10%) different ionic radii. In some applications, it may be advantageous for the z2:z1 ratio in this electrolyte to be less than 3 and more than 0.0001. In some applications, it may be advantageous for the z3:z1 ratio in this electrolyte to be less than 6 and more than 0.1. In some applications, it may be advantageous for the z4:z1 ratio in this electrolyte to be less than 6 and more than 0.1. In some applications, it may be advantageous for the z5:z3 ratio in this electrolyte to be more than 0.001 and less than 1. In some applications, it may be advantageous for the z4:z5 ratio in this electrolyte to be less than 12 and more than 0.01.

In some applications, it may be advantageous for this electrolyte to comprise at least two different halides. In some applications, it may be advantageous for S in this electrolyte to be a mixture of sulfur with either selenium or tellurium with the atomic fraction of non-sulfur in S to exceed 0.1% (or 0.001). In some designs, it may be advantageous for this electrolyte to exhibit an atomic ratio of O:S below 20:1. In some designs, it may be advantageous for this electrolyte to exhibit an atomic ratio of O:S above 1:2. In some designs, it may be advantageous for this electrolyte to exhibit an atomic ratio of F to all other halides (F: sum of (Br, Cl, and I)) above 1:100, or in some cases, above 1:20. In some designs, it may be advantageous for this electrolyte to exhibit an atomic ratio of I to all other halides (I: sum of (Br, Cl, and F)) above 1:1000. In some designs, it may be advantageous for this electrolyte composition to be tuned in such a way as for the electrolyte to exhibit ionic conductivity in the range from around 0.05 S cm$^{-1}$ to around 0.00005 S cm$^{-1}$ at 30° C. A lower ionic conductivity may undesirably limit the acceptable rate performance of cells comprising such electrolytes for some applications. A higher ionic conductivity may limit electrochemical stability of such electrolytes and lead to undesirably high electron conductance. In some designs, it may be advantageous for this electrolyte composition to be tuned in such a way as for the electrolyte to exhibit a melting point below 450° C. (or preferably below 400° C., or more preferably below 350° C.) (e.g., between 200° C. and 450° C.).

The following solid electrolyte composition is also disclosed:

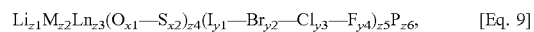

$$Li_{z1}M_{z2}Ln_{z3}(O_{x1}-S_{x2})_{z4}(I_{y1}-Br_{y2}-Cl_{y3}-F_{y4})_{z5}P_{z6},  \quad [Eq. 9]$$

where M is either a metal or a semimetal (or a mixture of metals or a mixture of semimetals or a mixture of metal(s) and semimetals) with the effective (average) valence m, with M selected from the above-discussed group I or group II, or both, together comprising (Si, Sn, Ge, As, Sb, Ga, Bi, In, Mo, Nb, Zr, Y, Hf, Ta, W, H, K, B, Cs, Na, Mg, Ca, Ba, Sr, Cu, Fe, V, Mn, Tl and Al), P is phosphorus, O is oxygen, S is sulfur, selenium, or tellurium, or their mixture; Ln is a lanthanide (such as lanthanum (La), cerium (Ce), neodymium (Nd), samarium (Sm), and gadolinium (Gd), among others or their mixture); and where x1+x2=1; y1+y2+y3+y4=1; z1+(z2)*m+(z3)*3+(z6)*5=(z4)*2+z5 or z1+(z2)*m+(z3)*3+(z6)*3=(z4)*2+z5; and 1<z1<24, 0≤z2<8, 0<z3<8, 0<z4<12, 0<z5<24, and 0<Z6<8. In some applications, it may be advantageous for this electrolyte to comprise at least two different metals/semimetals (in addition to Li) in the mixture, where at least two of such different metals/semimetals either exhibit different valences or substantially (e.g., by greater than 10%) different ionic radii. In some applications, it may be advantageous for this electrolyte to comprise at least three different metals/semimetals (in addition to Li) in the mixture, where at least two of the different metals/semimetals exhibit different valences. In some applications, it may be advantageous for the z2:z1 ratio in this electrolyte to be less than 3 and more than 0.0001. In some applications, it may be advantageous for the z3:z1 ratio in this electrolyte to be less than 3 and higher than 0.0001. In some applications, it may be advantageous for the z4:z1 ratio in this electrolyte to be less than 3 and higher than 0.1. In some applications, it may be advantageous for the z5:z1 ratio in this electrolyte to be less than 5 and more than 0.1. In some applications, it may be advantageous for the z6:z1 ratio in this electrolyte to be less than 1 and more than 0.001. In some applications, it may be advantageous for the z5:z6 ratio in this electrolyte to be less than 12 and more than 0.01.

In some applications, it may be advantageous for the z6:z4 ratio in this electrolyte to be more than 0.0001 and less than 2. In some applications, it may be advantageous for this electrolyte to comprise at least two different halides. In some applications, it may be advantageous for S in this electrolyte to be a mixture of sulfur with either selenium or tellurium with the atomic fraction of non-sulfur in S to exceed 0.1% (or 0.001). In some designs, it may be advantageous for this electrolyte to exhibit an atomic ratio of O:S below 20:1. In some designs, it may be advantageous for this electrolyte to exhibit an atomic ratio of O:S above 1:2. In some designs, it may be advantageous for this electrolyte to exhibit an atomic ratio of F to all other halides (F: sum of (Br, Cl, and I)) above 1:100, or in some cases above 1:20. In some designs, it may be advantageous for this electrolyte to exhibit an atomic ratio of I to all other halides (I: sum of (Br, Cl, and F)) above 1:1000. In some designs, it may be advantageous for this electrolyte composition to be tuned in such a way as for the electrolyte to exhibit ionic conductivity in the range from around 0.05 S cm$^{-1}$ to around 0.00005 S cm$^{-1}$ at 30° C. Lower ionic conductivity may undesirably limit the acceptable rate performance of cells comprising such electrolytes for some applications. Higher ionic conductivity may limit electrochemical stability of such electrolytes and lead to undesirably high electron conductance. In some designs, it may be advantageous for this electrolyte composition to be tuned in such a way as for the electrolyte to exhibit a melting point below 450° C. (or preferably below 400° C., or more preferably below 350° C.) (e.g., between 200° C. and 450° C.).

Attractive properties of the disclosed electrolytes (Eqs. 1-9) may include: (i) low melting temperature (within a range of around 150 to around 600° C., below that of the electrolyte decomposition), which allows infiltration of the electrolyte into densely packed electrodes for achieving high volumetric capacity; (ii) good wetting on electrode surfaces; (iii) low charge-transfer resistance at the electrolyte/active material interphase at the electrode surface; (iv) compatibility with a broad range of electrode materials even at elevated temperatures; (v) high grain boundary conductivity, which may allow one to achieve high rate performance in nanostructured electrodes; (vi) broad potential range of experimentally observed stability in cells; (vii) high ionic conductivity; (viii) chemical compatibility with many electrode materials; (ix) improved stability of the current collector(s) during interactions with the electrolyte, particularly at higher temperatures; and (x) improved resistance to dendrite (e.g., Li dendrite) penetration during cycling in cells, among others.

It will be appreciated that additional elements or particles may be added to the disclosed electrolytes (Eqs. 1-9) or other electrolytes to further improve their performance characteristics or stability in cells. For example, such additions may be conducted to further reduce the electrolyte melting temperature or to better match the thermal expansion coefficient of the electrolyte to that of the electrode material (or the separator membrane) or to provide other desirable improvements.

In some cell designs comprising electrolyte compositions in accordance with Eqs. 1-9, it may be advantageous for such electrolyte composition(s) to be tuned in such a way as for the electrolyte to either (i) exhibit thermodynamic stability at the maximum cell cathode potential (e.g., above around 2.0 V vs. Li/Li+ for most cathodes) or (ii) induce formation of the stabilizing surface layer, which prevents substantial (e.g., greater than 1% after 10,000 hours at 30° C.) and continuous electrolyte decomposition upon exposure of this electrolyte at average cell cathode potentials (for most cathodes, in the range from around 2.0 to around 4 V vs. Li/Li+; in some high voltage cathodes, to around 5 V vs. Li/Li+).

In some cell designs comprising electrolyte compositions in accordance with Eqs. 1-9, it may be advantageous for such electrolyte composition(s) to be tuned in such a way as for the electrolyte to either (i) exhibit thermodynamic stability at the minimum cell anode potential (e.g., from around 0 V to around 0.6 V vs. Li/Li+ for most anodes for Li and Li-ion batteries) or (ii) induce formation of the stabilizing surface layer, which prevents substantial (e.g., greater than 1% after 10,000 hours at 30° C.) and continuous electrolyte decomposition upon exposure of this electrolyte at average cell anode potentials (e.g., from around 0 V to around 0.6 V vs. Li/Li+ for most anodes for Li and Li-ion batteries).

Selection of particular electrolyte compositions in accordance with Eqs. 1-9 may depend on the particular electrode chemistry and the cell requirements (such as operational temperature range, voltage range, power performance, etc.), the presence of functional coating(s) on the surface of electrode particles, permissible costs, thermal stability of electrodes or cell components, and other parameters. The presence of sulfur, selenium, or tellurium in such electrolytes may enhance Li-ion conductivity through the bulk of the electrolyte(s) as well as through the grain boundaries and interfaces (or interphases) between the electrolyte(s) and electrode(s). In addition, the presence of sulfur, selenium, or tellurium may affect ductility and melting point of the electrolyte(s) and increase their fracture toughness. The optimum sulfur, selenium, or tellurium content in each electrolyte composition depends on the particular chemistry of the electrodes, binder, and current collector(s) in contact with the electrolyte. The presence of fluorine (F) in such electrolytes may assist in forming a protective surface layer on a current collector (e.g., on aluminum (Al)-based, titanium (Ti)-based, or other suitable current collector materials) that would help to prevent its corrosion. The presence of F may further assist in the formation of the more favorable (low resistance, more stable) interphases/interfaces with the active material and increase electrolyte conductivity. The optimum F content in each electrolyte composition depends on the particular chemistry of the electrodes, binder, and current collector(s) in contact with the electrolyte. The presence of metals, semimetals, nitrogen, and phosphorus may also enhance ionic conductivity of the interfaces, grain boundaries, or bulk electrolyte. The use of a broad range of atoms in a single electrolyte (such as described in Eqs. 1-9—e.g., multiple halides, sulfur, selenium, oxygen, nitrogen, phosphorus, multiple metals and semimetals, rare earth elements, etc.) and their relative fractions may be optimized in order to: (i) reduce the minimum obtainable grain size of the solid electrolyte material during cooling from the molten state (which may enhance electrolyte mechanical properties) or, in other words, reduce the critical cooling rate required for the formation of small grain sizes; (ii) assist in matching thermal expansion coefficients within the cell assembly so that the cell is more mechanically stable at room temperature; (iii) satisfy the requirements of achieving favorable electrolyte/active material interphases/interfaces at both the anode and the cathode active materials; and (iv) achieve optimal operation (e.g., lowest resistance and highest stability) in a desired temperature range; or (v) achieve faster ionic transport, better stability, or other useful properties.

Synthesis of the electrolyte compositions may involve simply grinding the precursors of the constituents in the proper (for the desired stoichiometry) ratios (e.g., such precursors as $Li_2O$, $Li_3N$, LiOH, LiHS, LiI, LiCl, LiF, LiBr, or $LiNH_2$, as well as hydroxides, hydrogen sulfides, sulfides, oxides, phosphides, nitrides, halides, and amides of various metals and semimetals, depending on the desired composition of the electrolyte; particles of pure metals and semimetals, etc.) and melting the mix under a controlled environment (e.g., under flowing or static Ar, He, or under vacuum). In some designs, melting the mix in an atmosphere of air, $N_2$, or $O_2$ may be advantageous from economic or other perspectives. In some designs and for some precursor compositions, the reaction (heating) chamber may be sealed. In other designs, the reaction (heating) chamber may be vented. The by-products of the reactions that may take place during heating and mixing of the constituents (e.g., such by-products as water, ammonia, etc.) may be removed during electrolyte synthesis. For example, mixing hydroxide(s) with halide(s) results in the formation of water (e.g., $4LiOH+2NaOH+LiBr+LiF+LiCl=Li_4Na_2O_3BrFCl+3H_2O$) and mixing of amide(s) with halide(s) results in the formation of ammonia (e.g., $6LiNH_2+LiCl+LiBr=Li_8N_2ClBr+4NH_3$).

In some designs, it may be advantageous to prevent formation of by-products of the reactions that take place during heating and mixing of the constituents. In this case, it may be advantageous to use a mix of precursors that comprise elements in the stoichiometric ratio equal to (or close to) that of the final electrolyte melt. For example, if a hydrogen-free electrolyte composition is desired (e.g., for improved chemical or electrochemical stability, or other improved properties), it may be advantageous to use $Li_2O$ as a source of Li and O instead of LiOH (or Li as a source of Li instead of LiOH). This is because LiOH may induce an undesirable formation of water, acids, and hydrogen during heating and, additionally, some H may be inevitably and undesirably incorporated into the electrolyte unless excessive heat-treatment is used. Such heat-treatment is expensive and may induce a loss of electrolyte due to its evaporation.

In some designs, it may be advantageous to prevent evaporation of the reaction constituents that take place during heating and mixing of the constituents. In this case, it may be advantageous to use sealed reaction vessels. In addition or as an alternative, it may be advantageous to select precursors that exhibit low vapor pressure at the heating/mixing conditions. For example, if S incorporation into electrolyte is desired, it may be advantageous to use metal sulfide (e.g., $Li_2S$) as a source of S because pure S would exhibit too high vapor pressure at the mixing temperatures (typically in the range from around 300 to around 900° C.).

In some designs, the dissolution of some of the precursors (e.g., metal oxides, such as $Li_2O$) into the mix may require relatively high mixing temperatures (e.g., greater than 500° C.) for reasonably rapid dissolution, partially due to the strong bonds in such compounds and their resulting high melting point (melting point of $Li_2O$, for example, is 1438° C.). Such high mixing temperatures may induce undesirably high vapor pressure(s) of the electrolyte or other precursors or reaction constituents. To overcome such a challenge, it may be advantageous to use a high specific surface area (e.g., 10-2000 $m^2/g$) form of the particles (e.g., nanoparticles, porous particles, agglomerated particles, or flakes, etc.) for such high melting point precursors to increase the rate of their dissolution into the mix and rapid formation of the desired electrolyte composition within a reasonable time and at a reasonable cost. It may also be advantageous to utilize mechanical mixing (agitation) during the melt formation. In some designs, sound (or ultrasound) mixing may be advantageously used.

It will be appreciated that the above precursors are provided as example precursors only and that other compositions may be used as precursors to achieve the desired stoichiometry of the final electrolyte product.

Another aspect of the present disclosure pertains to appropriate methods for the fabrication of electrochemically stable solid state batteries with high volumetric capacity and suitable rate performance at around room temperature.

The use of solid state electrolytes (SSE) is typically accomplished by mixing or milling the powders of the active material, conductive (e.g., carbon) additives and SSE together and pressing the mix into the electrode. In this process the volume of active material is generally limited to 25-50 vol. % to achieve a satisfactory conductivity and rate performance. But this is significantly lower than the 65-90 vol. % of active material found typically in regular electrodes for use with liquid electrolytes. Similarly, the separator membrane is normally prepared by sintering or pressing the SSE into the solid membrane material, typically 50-150 microns in thickness, which is higher than the 10-20 micron membranes regularly used in conjunction with liquid electrolytes. These limitations may significantly increase the volume needed to store energy and thus reduce the energy density of cells with SSE. In many cases, lower energy density also leads to a higher price, which is also undesirable.

One aspect of the present disclosure involves melt-infiltration (as opposed to mixing) of the SSE (e.g., including, but not limited to those described herein by Eqs. 1-9) into the electrodes (or into the electrode/separator stacks or rolls) at elevated temperatures when the SSE is in a liquid phase. In this case a high volume fraction (e.g., 50-90 vol. %) of the active material in the electrodes with SSE may be achieved. Similarly, a thin SSE membrane (or SSE-based composite membranes comprising separators) may be fabricated (e.g., from around 0.5 to around 30 microns) either as a surface layer on the top of the electrode or as a composite produced by infiltrating a porous layer (porous membrane). In some designs, such a porous layer may be deposited on the electrode surface prior to infiltration.

In some designs, the porous membrane may comprise more than one layer. At least one layer of such a membrane should be electrically insulative to prevent electron conduction through the composite SSE (produced by infiltration into the membrane) in order to prevent or significantly minimize self-discharge of a cell. If a metal anode (e.g., Li metal anode in the case of Li batteries) is used in the construction of the cell in conjunction with the SSE, the layer of the (multi-layered) porous membrane may be advantageously placed in direct contact with the metal anode (with Li) in such a way as to provide good wetting and good charge transfer resistance at the metal (Li)/membrane interface. In some designs, such a layer of the porous membrane may comprise a material that exhibits high (e.g., greater than $10^{-4}$ S cm$^{-1}$) electrical conductivity or high mixed (electron and ionic) conductivity. In some designs, such a surface layer of the porous membrane may comprise electrically conductive carbon. In some designs, a carbon layer may comprise carbon nanotubes, carbon fibers, carbon (nano) fibers, graphite, graphite ribbons, carbon black, graphene, exfoliated graphite, porous carbon (including activated carbon or templated carbon), among other forms of conductive carbon. In some designs, such a layer of the porous membrane may comprise transition metal(s). In some designs, metal(s) may be in the form of (nano)fibers, (nano)wires, (nano)flakes or (nano)particles. In some designs, metals that exhibit very low solubility in Li at room temperature (e.g., less than 1%) may be advantageously utilized (e.g., Cu, Ti, Ni, and others). In some designs, such a surface layer of the porous membrane may comprise oxides, sulfides or phosphides or halides of transition or rare earth metal(s) or lithium halides (e.g., LiI, LiF, LiCl, LiBr), lithium sulfide, lithium nitride, lithium phosphide or other lithium salts. In some designs, the porous layer comprising carbon or metal particles may be placed or imbedded into the surface of a Li anode prior to electrolyte infiltration. In some designs, different layers of the porous membrane may comprise (interconnected) particles of different size, different shape, exhibiting different porosity, having different composition, etc. In some designs, it may be advantageous for the center of the membrane to comprise larger particles (including elongated particles, fibers) and larger pores in order to provide enhanced mechanical stability and improved performance.

FIGS. 2A-2B illustrate example embodiments of the separation membranes. FIG. 2A illustrates a solid battery unit cell with a separation membrane 201 comprising two distinct porous layers 202 and 203. In this example, each layer is composed of interconnected particles of different aspect ratio, size, and chemistry. The layer 203 is partially infiltrated with a Li metal anode 205, while both the layer 202 and a portion of the layer 203 are infiltrated with a solid electrolyte 204. FIG. 2B illustrates a solid battery unit cell with a separation membrane 201 comprising three distinct porous layers 203, 207, and 208 with the middle layer comprising larger diameter fibers.

The use of vacuum (e.g., from around 400 Torr to around 0.0001 Torr pressure) may assist the SSE melt-infiltration process by overcoming some of the wetting issues (e.g., insufficiently good wetting or insufficiently low viscosity at the temperatures suitable for the formation of low resistance interfaces or interphases with the electrode or the current collector). In addition, the electrolyte composition may be optimized or further modified to reduce its viscosity (for a given temperature of the melt) or its wetting on the electrode pore surface even if the ionic conductivity of the SSE may be reduced as well with such modifications.

Figure 3A:
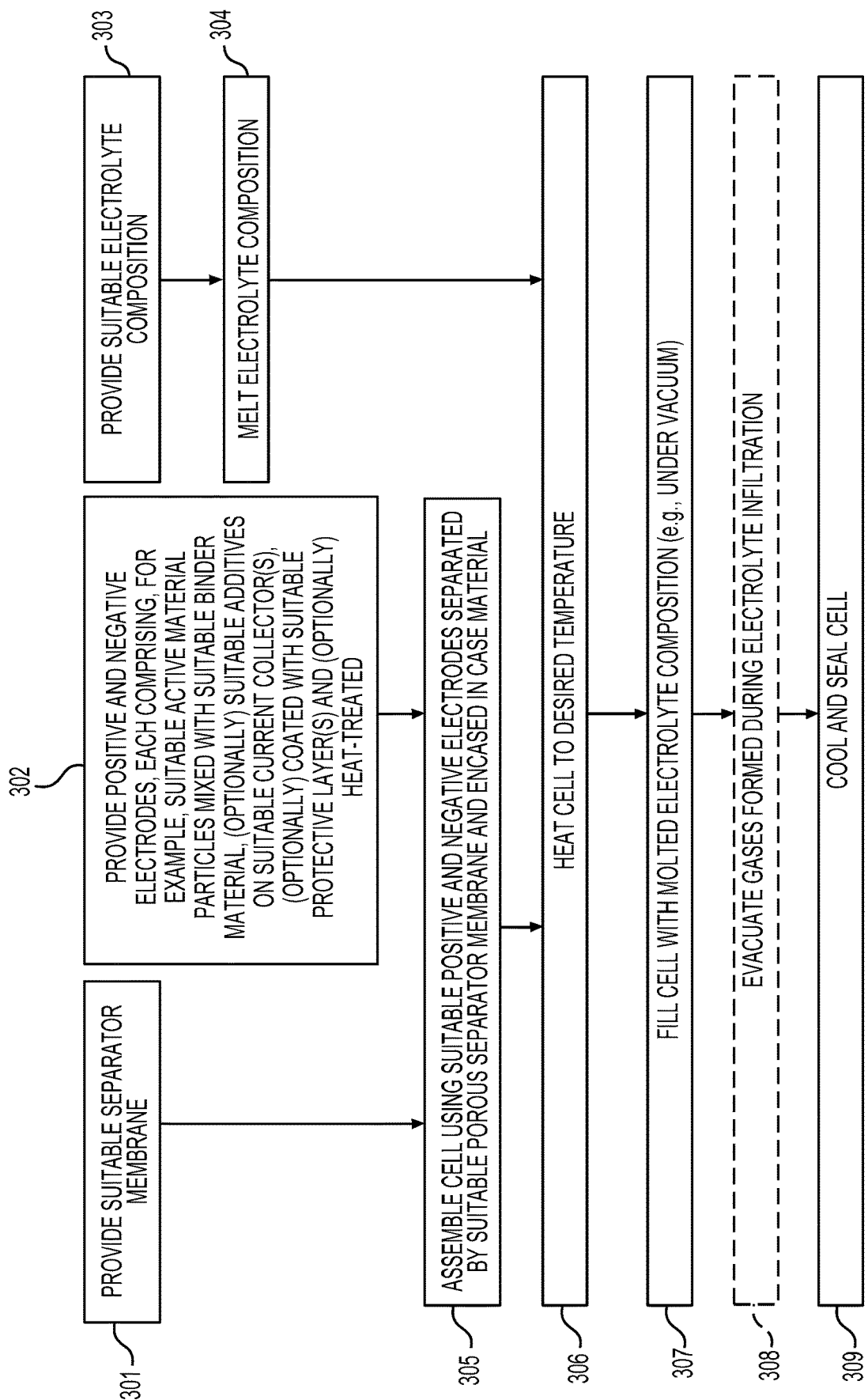
FIGS. 3A-3B illustrate example methods of solid state battery fabrication.
Figure 3B:
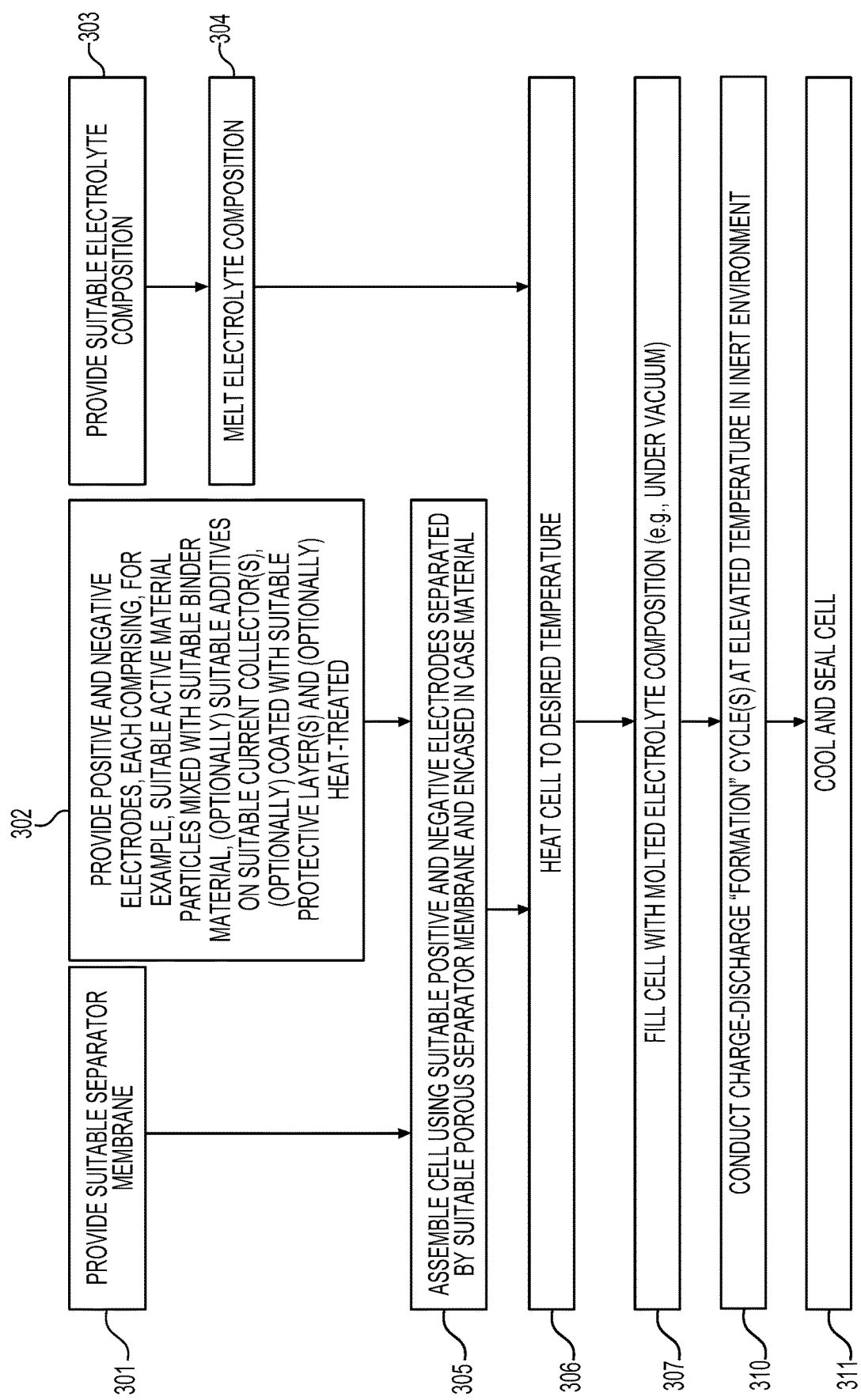

FIGS. 3A-3B show example processes for manufacturing solid electrolyte cells of the type disclosed herein. The example process of FIG. 3A may involve: providing (e.g., procuring, making, modifying, etc.) a suitable separator membrane (block 301);); providing (e.g., procuring, making, modifying, etc.) suitable anodes and cathodes (each comprising suitable active material, suitable binder material, suitable additives, suitable current collector, and optionally suitable protective coatings, as an example, with additional or modified components as desired) (block 302); providing (e.g., procuring, making, modifying, etc.) a suitable solid electrolyte composition (block 303); melting the solid electrolyte (block 304); assembling a cell using suitable positive and negative electrodes separated by a suitable porous separator membrane and encased in a case material (block 305); heating the cell to the desired temperature (suitable for melt-infiltrating of the electrolyte) (block 306); filling the cell with the molten electrolyte (e.g., under vacuum) (block 307); (optionally) evacuating the gases formed during the electrolyte infiltration (optional block 308); and cooling down and sealing the cell (block 309). The separator membrane may comprise several layers. The separator membrane(s) may be deposited onto at least one (or both) of the electrodes. The separator membrane(s) may comprise ceramic particles (such as oxide particles—e.g., MgO, $Al_2O_3$, ZrO, etc.). In some designs, inorganic material(s) may comprise 75-100% of the separator membrane. The separator membrane(s) may advantageously comprise elongated particles (such as nanowires, whiskers, nanofibers, nanotubes, flakes, etc., with aspect ratios above 3 (preferably above 10 and even more preferably above 30) and an average smallest dimension (e.g., diameter or thickness) below 500 nm). Such high aspect ratio, elongated (in two or preferably in one dimension) particles may be used to achieve high porosity of the membrane and thus maximize its ionic conductivity when fully filled with the electrolyte.

The example process of FIG. 3B is similar to that described above with reference to FIG. 3A, except that the so-called "formation" charge-discharge cycles (block 310) are conducted at elevated temperatures in order to accommodate some of the volume changes in the electrodes and assist in evacuation of gases that may form during initial cycles, before the cell is sealed (block 311) and is ready for end (e.g., customer) use.

In some designs, electrodes melt-infiltrated with solid electrolytes may be individually constructed. In some designs, different electrolytes may be used for the anodes and cathodes (e.g., a first electrolyte for the anode and a second, distinct electrolyte for the cathode). In some designs, only one of the electrodes (e.g., either an anode or a cathode) may comprise (or be infiltrated with or be coated with) a solid electrolyte.

Figure 4A:
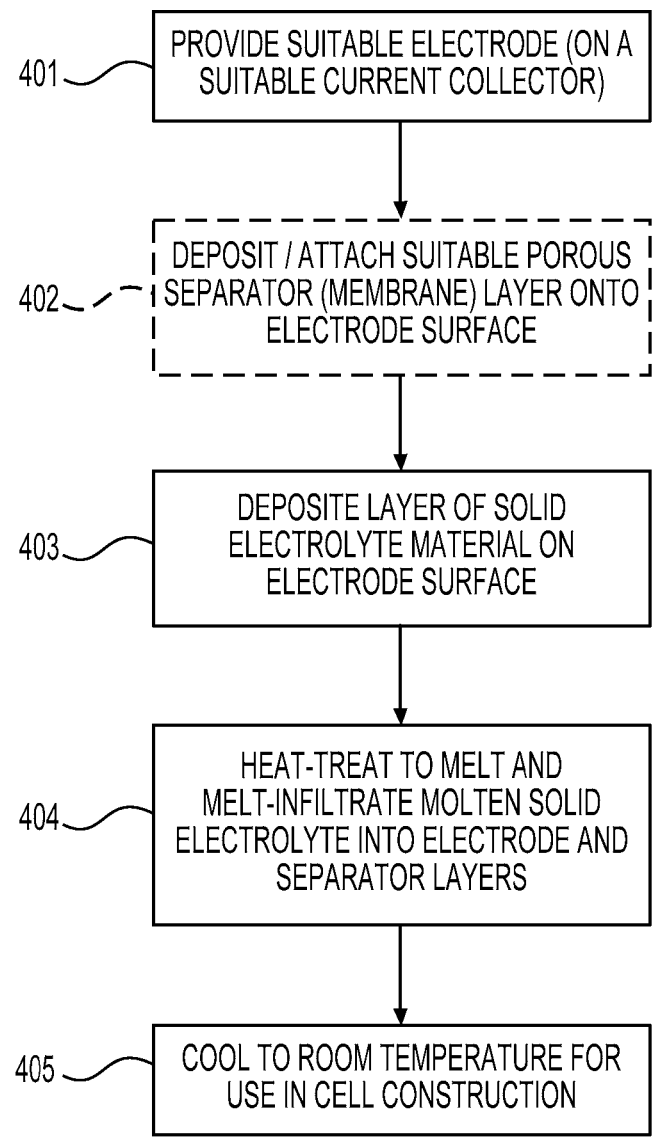
FIGS. 4A-4B illustrate example methods of the fabrication of solid electrolyte-filled electrodes for use in various battery cell constructions.
Figure 4B:
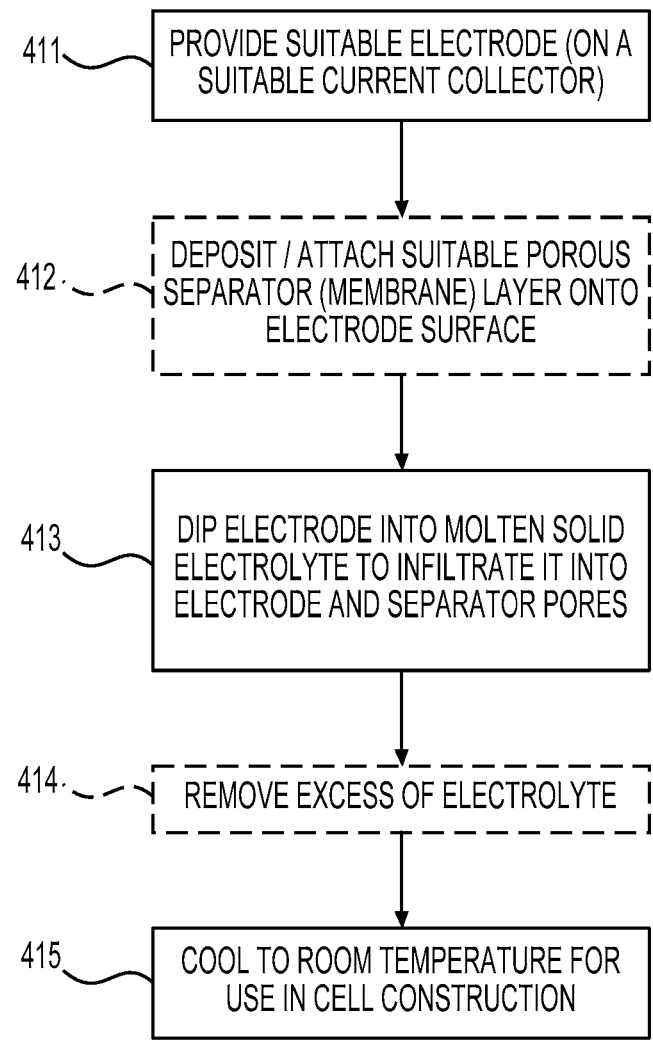

FIGS. 4A-4B show example processes for manufacturing electrodes infiltrated with solid electrolyte of the type disclosed herein. The process of FIG. 4A may involve: providing (e.g., procuring, making, modifying, etc.) a suitable electrode (block 401); (optionally) depositing or attaching a suitable separator membrane onto the electrode surface (optional block 402); depositing a layer of the solid electrolyte on the top surface of the electrode (e.g., in the form of a powder or a paste) (block 403); heating the assembly (to melt electrolyte) and melt-infiltrating the electrode (with optional separator layer) with the molten electrolyte (block 404); and cooling down to room temperature for use in the desired cell construction (block 405). The process of FIG. 4B may involve: providing (e.g., procuring, making, modifying, etc.) a suitable electrode (block 411); (optionally) depositing or attaching a suitable separator membrane onto the electrode surface (optional block 412); dipping the assembly into the molten electrolyte and melt-infiltrating the electrolyte into the pores (block 413); (optionally) removing excess of electrolyte (optional block 414); and cooling down to room temperature for use in the desired cell construction (block 415).

Figure 5:
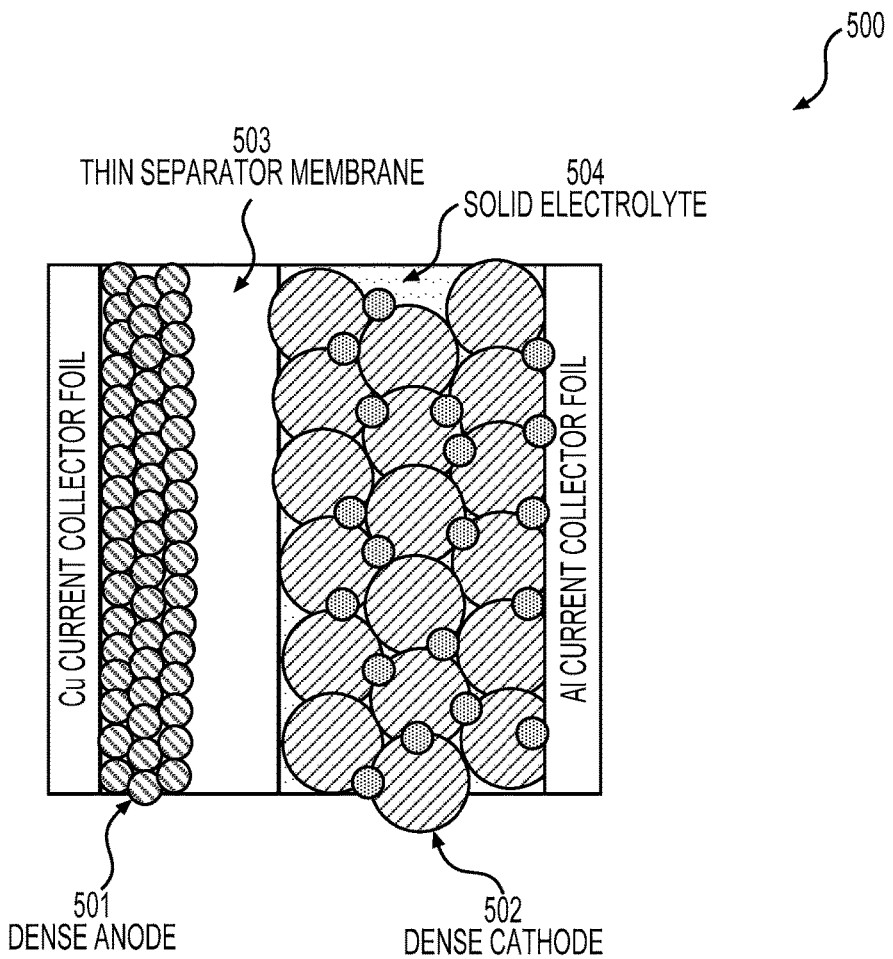
FIG. 5 illustrates an example unit stack (building block) of a solid state battery with melt-infiltrated solid electrolyte.

FIG. 5 shows an example unit stack of one type of solid state battery cell as disclosed herein (a building block of a solid battery cell). Such a unit stack may comprise: a suitable (e.g., thermally stable, densely packed, and wettable by electrolyte) anode 501, a suitable (e.g., thermally stable, densely packed, and wettable by electrolyte) cathode 502, a suitable (e.g., thermally stable and wettable by electrolyte) porous separator membrane 503, all infiltrated with a solid electrolyte 504.

It has been found to be advantageous to prevent a relatively hot electrolyte melt from inducing significant undesirable damage to the separator membrane, to the binder, to the conductive additives, to the active material, to the electrical and mechanical integrity of the electrodes, to the current collectors and to other important components of the individual electrodes (if individual electrodes are infiltrated with a suitable molten electrolyte) or to the electrode/separator stack (or roll) (if a stack or roll is infiltrated with a suitable molten electrolyte) or to the pre-assembled cell (if the stack or roll is pre-assembled/pre-packaged into the case before the melt-infiltration with a suitable electrolyte). Some of the aspects of the present disclosure describe route enhancements to overcome such potential negative effects of the disclosed process.

The most conventionally used binders for commercial Li-ion battery electrodes are carboxymethyl cellulose (CMC) (most commonly used for graphite anodes) and polyvinylidene fluoride (PVDF) (most commonly used for intercalation-type lithium metal oxide cathodes). Such binders may partially decompose at elevated temperatures in contact with the electrolyte melt, inducing formation of gases (which may partially block some of the electrode pore access to the electrolyte) and reducing their mechanical strength (which may reduce the integrity of the electrode or adhesion of the electrode to the current collector). Other conventional polymer binders may similarly suffer from such shortcomings. In one approach to minimize gas generation (and also to reduce binder shrinkage during cooling from the electrolyte-infiltration temperatures), an electrode (or electrode/separator stack or the pre-assembled cell) is heated to a temperature close to that of the electrolyte infiltration (e.g., within around 100° C. below the electrolyte infiltration temperature to around 300° C. above the electrolyte infiltration temperature). In this case some of the gases that may be generated during thermal decomposition of the organic binders (and possibly their partial or complete carbonization) may be evacuated prior to electrolyte infiltration, which is advantageous. In cases when organic binders are used, heat-treatment may be performed under vacuum (e.g., to prevent oxidation (if undesirable), to evacuate the effluent that is generated, or to satisfy other criteria). The level of vacuum may change during the electrolyte infiltration. A particular heat-treatment temperature may be optimized for the particular electrode composition. Too low of a temperature might be insufficient for gas evacuation, while too high of a temperature may induce undesirable reactions, reduce the mechanical strength of the electrode or the electrode-current collector interfaces, or induce other undesirable processes.

Many epoxy resins exhibit excellent thermal stability (including so-called fire-retardant epoxy resins) with no significant (e.g., less than 5%) mass loss at temperatures up to around 400-450° C., which is particularly attractive for their use as binders in the context of the present disclosure. The use of fluoropolymers as polymer binders may also be very attractive because they exhibit very good thermal stability and thus may be suitable for the electrolyte melt-infiltration into the electrode. In addition, many fluorinated monomers may be used to modify the polyurethane resins, acrylic resins (e.g., acrylate polymer and copolymer resins, such as ethylene butyl-, ethyl-, and methyl-acrylates and -methacrylates, etc.), epoxy resins, styrene, and other polymers to improve their thermal properties. For example, by incorporating just 10-20% of the fluorinated monomers into the acrylic polymers/co-polymers, their high temperature (180-250° C.) adhesion strength may increase by over 3 times, making such fluorinated polymers more suitable as electrode binders exposed to high temperature during the melt-infiltration of the electrolyte. Other polymers with good thermal stability that may be utilized as suitable binders may include (or comprise) poly(p-phenylene); poly (tetrafluoroethylene); polyetherimide; polyaryl etherketone, polysulfone; and poly(phenylene sulfide).

In some designs, it may be advantageous to utilize a binder material that partially dissolves into the electrolyte and assists in building a favorable interface/interphase between the active material and electrolyte. In some designs, such a binder material may comprise a metal salt.

In another approach to reduce gas generation and also to enhance mechanical strength of the electrodes at elevated temperatures (including the cell heating and cooling during the electrolyte infiltration), thermally-stable (at near the melt-infiltration temperatures) elongated particles (such as nanowires, whiskers (including various type of ceramic whiskers), nanotubes (including various type of carbon nanotubes), flakes, etc.) with aspect ratios above 3 (preferably above 10 and even more preferably above 30) and the smallest dimensions (e.g., diameter or thickness) below 400 nm (preferably below 100 nm and even more preferably below 30 nm) may be added into the electrode (or electrode/binder) mix. Such high aspect ratio, elongated (in two or preferably in one dimension) nanoparticles may be used to connect/join the active material particles and may enhance the mechanical and electrical stability of the electrodes during the melt infiltration. Such particles may additionally enhance the electrical conductivity (e.g., if the particles are electrically conductive) and minimize gas generation (e.g., if the particles adsorb at least some of the gases generated, if the particles modify the structure and properties of the binders, if the particles assist in forming interconnected pathways for gases to escape from the electrode, etc.) during the electrolyte melt-infiltration process. A suitable weight fraction of such elongated particles may range from around 0.01 wt. % to around 25 wt. % and from around 0.01 vol. % to around 25 vol. % of the total electrode mass and volume, respectively. It may be useful to select two or more kinds of elongated particles/additives in order to achieve an optimal electrode performance in cells (e.g., combine ceramic (e.g., oxide, nitride, sulfide, fluoride, etc.) particles that may offer enhanced electrolyte wetting or may adsorb some of the gases or bond particularly well with a binder with conductive (e.g., carbon) particles that may offer enhanced electrical conductivity to the electrode). If two types of particles are used, their relative weight fractions may range from 1:9999 to 9999:1.

It may also be preferred for the binder material not to undergo substantial (e.g., above around 15 vol. %) shrinkage during the heat treatment and thus the binder composition may be selected accordingly. In some designs, the binder material may be selected to become ceramic after the electrode heat-treatment process (e.g., if the binder material is selected from a broad range of the precursors for polymer-derived ceramics). In some designs, the binding material may also be vapor-deposited (e.g., by using vapor infiltration, chemical vapor deposition (CVD), atomic layer deposition (ALD), or other suitable processes) on the porous electrode surface (e.g., as a conformal or at least partially conformal coating), connecting individual electrode particles together. In this case such a coating acts as a binder (and in some cases, as a protective layer). In some designs, such a coating may comprise an oxide layer. In some designs such a coating may be electrically conductive. In some designs such a coating may comprise two or more layers. In some designs such a coating may comprise a metal (preferably selected to exhibit a melting point at least 100° C. above the melt-infiltration temperature and relatively slow reactivity with the molten electrolyte) or a carbon. In some designs (e.g., when the ionic conductivity of such a coating is low), it may be preferable that the coating covers no more than around 90% (more preferably no more than 80% or even more preferably no more than 60%) of the surface area of the individual active particles in the electrode.

The most conventionally used separator membranes for commercial Li-ion battery electrodes typically comprise polymers, such as polypropylene or polyethylene, or both. In some cases, a porous ceramic layer is deposited on the surface of the separator membranes (typically at the cathode side) to minimize shrinkage at elevated temperatures and increase cycle life and safety. In some cases, a separator membrane is coated with a layer of a surfactant to increase wetting in some electrolytes. However, conventional membrane design may not be ideal for melt-infiltration with a solid electrolyte material. First, depending on the chemistry and the temperature of the electrolyte melt, poor wetting may be a serious issue that prevents infiltration of the melt. Typically used surfactants are not thermally stable and may evaporate or decompose during the melt-infiltration process. Second, mechanical properties of the separator material may be compromised (particularly at higher temperatures). Third, a separator membrane may start melting at elevated temperatures, inducing pore closure and shrinkage. For example, both polyethylene and polypropylene typically melt at temperatures as low as 115-135° C. Fourth, typical polymer separator membranes may decompose and induce formation of undesirable gaseous products at melt-infiltration temperatures.

Porous ceramic membranes (e.g., porous oxide-based or porous nitride-based membranes, among others) may be more suitable for melt-infiltration with a solid electrolyte material than typical polymeric membranes. In some designs, the use of a fibrous porous ceramic may be advantageous. Porous ceramic membranes comprising zirconium (Zr) or aluminum (Al) or some of the rare earth elements (e.g., lanthanum) may be particularly advantageous as they may offer a combination of good electrochemical and thermal stabilities, which can be advantageous in the context of the present disclosure. In some cases, low-cost porous ceramics comprising Si (e.g., as in silicon oxide or other ceramics), Mg (e.g., as in magnesium oxide or other ceramics), Ti (e.g., as in titanium oxide or other ceramics), Zn (e.g., as in zinc oxide or other ceramics), Cu (e.g., as in copper oxide or other ceramics), Cd (e.g., as in cadmium oxide or other ceramics), Mn (e.g., as in manganese oxide or other ceramics), Fe (e.g., as in iron oxide or other ceramics), or their mixtures may be electrochemically unstable at a low potential (e.g., below around 1 V vs. Li/Li+) when used as a part of the separator membrane for solid state batteries. In cases where such membrane material compositions (e.g., comprising sufficiently high content of Si, Mg, Ti, Cu, Zn, Cd, Mn, or Fe, or other elements that may induce electrochemical instability of the membrane on one of the electrodes) are desired to be used (e.g., for economical or other practical reasons, such as compatibility with the electrolyte melt, better wetting, better ionic conductivity, better safety, etc.), it may be advantageous to form a porous coating (from around 10 nm to around 20 microns in thickness) of an electrochemically stable material (e.g., aluminum oxide, zirconia oxide, solid electrolyte particles, or other suitable ceramic materials) at least on one side of such a porous ceramic membrane (e.g., in contact with an electrode that experiences a separator-degrading electrochemical potential, such as a low potential anode). This surface layer may be in the form of bonded (or sintered) particles. Spray coating or slurry-based deposition are examples of suitable low-cost methods that may be utilized for the formation of such a surface coating layer. The suitable thickness of such a porous layer may range from around 10 nm to around 50 microns. The porous layer may also be advantageous for reasons other than the above rationale to improve electrochemical compatibility of the membrane material with both electrodes (e.g., for improved safety or thermal stability or mechanical stability, etc.).

In some designs, the separator membrane(s) may advantageously comprise elongated particles (such as nanowires, whiskers, nanofibers, nanotubes, flakes, etc. with aspect ratios above 3 (preferably above 10 and even more preferably above 30) and the average smallest dimensions (e.g., diameter or thickness) below 500 nm). Such high aspect ratio, elongated (in two or preferably in one dimension) particles may be used to achieve high porosity of the membrane and thus maximize its ionic conductivity when fully filled with the electrolyte.

Alternatively to (or in combination with) the formation of a porous layer on one side of the membrane, a thin (e.g., from around 0.5 nm to around 500 nm) conformal surface layer may be deposited on the internal (in addition to the external) surface area of the membrane. Such a conformal deposition may be conducted in a gaseous phase (e.g., by CVD or ALD, or other vapor deposition process), in a liquid phase (e.g., via a sol-gel, electrodeposition, electroless deposition, or another suitable wet chemical process), via a spray deposition, or other methods (including those that include a combination of wet and dry steps and may involve thermal treatment(s) in controlled environment(s)). Formation of this thin conformal coating may improve the interface (or interphase) with the solid electrolyte (in either a solid or a molten form) or provide other benefits (e.g., improved mechanical properties, reduced self-discharge or leakage, improved ionic conductivity and rate performance of a solid cell, etc.).

In some designs, thermally stable porous polymer membranes (preferably those with a melting or decomposition temperature in excess of around 200° C., or more preferably in excess of around 250° C.) may be used for melt-infiltration with a solid electrolyte material. For example, low-cost cellulose as well as various cellulose derivatives (such as nitrates, sulfates, etc.) and salts typically exhibit a melting point in excess of 260° C., which is higher than that of polyethylene and polypropylene and may be sufficiently high to be suitable for electrolyte melt-infiltration. Many epoxy resins exhibit even better thermal stability (including so-called fire-retardant epoxy resins) with no significant (e.g., less than 5%) mass loss at temperatures up to around 400-450° C., which is particularly attractive. A broad range of fluoropolymers (e.g., fluorinated acrylates, polytetrafluoroethylene (PTFE) and its copolymers such as FEP, PFA, and THV, to name few) exhibit very good thermal stability (often in excess of 300-330° C.) and may be suitable for the electrolyte melt-infiltration. Similarly, many fluorinated monomers may be used to modify the polyurethane resins, epoxy resins, acrylic resins (e.g., acrylate polymer and copolymer resins, such as ethylene butyl-, ethyl-, and methyl-acrylates and -methacrylates, etc.), styrene, and other polymers to improve their thermal properties. Other polymers with good thermal stability that may be utilized as a suitable membrane may include (or comprise) poly(p-phenylene), poly(tetrafluoroethylene), polyetherimide, polyaryletherketone, polysulfone, and poly(phenylene sulfide).

In some designs (e.g., in order to improve wetting by a solid electrolyte or a solid electrolyte melt, or to improve thermal, mechanical, or electrochemical stability) porous polymer membranes may comprise ceramic particles, thus forming polymer-ceramic composite membranes. The suitable dimensions of such ceramic particles may generally range from around 2 nm to around 5 microns, depending on the cell design. The weight fraction of such ceramic particles in the polymer-ceramic composites may range from around 0.02 wt. % to around 99 wt. %.

In some designs, it may be advantageous to form a porous coating (from around 50 nm to around 20 microns in thickness) of an electrochemically stable and thermally stable material (e.g., ceramic or solid electrolyte with a sufficiently high melting point) at least on one side of such a porous polymer or polymer-ceramic membranes in the context of the present disclosure. This surface layer may be in the form of bonded (or sintered) particles. Similar to the above formation of a porous coating on the surface of ceramic membranes, spray deposition (dry or wet) or slurry-based deposition may be used for the formation of such a coating. Alternatively, a thin (e.g., from around 0.5 nm to around 500 nm) conformal surface layer may be deposited on the internal surface area of the polymer or polymer-ceramic composite membrane. Such a conformal deposition may be conducted in a gaseous phase (e.g., by CVD or ALD, or other vapor deposition process), in a liquid phase (e.g. via a sol-gel, electrodeposition, electroless deposition, or another suitable wet chemical process), via a spray deposition, or other methods (including those that include a combination of wet and dry steps and may involve thermal treatment(s) in controlled atmosphere(s)).

For some designs and applications, an electrically isolative porous coating on the surface of at least one of the electrodes may be advantageously used instead of the typical standalone porous separator membrane used in most solid state batteries (including those produced by melt-infiltration of the solid electrolyte at elevated temperatures). Various ceramic materials (including solid electrolyte particles), various thermally stable polymers and various polymer-ceramic composites may be utilized in the composition of such a porous surface coating. A suitable thickness of such a porous coating may range from around 0.1 to around 40 microns, depending on the size of the active particles, smoothness of the electrode, and electrode handling procedures during cell assembling, as well as the stresses arising during cell use. In contrast to the standalone membranes, such a coating may utilize the electrode for its mechanical support. As such, it may be thinner and less expensive to produce than a standalone membrane. The porous surface coating layer may comprise electrically insulating particles mixed with binders, similar or identical to those used for electrode construction. In some designs, it may be advantageous to use two different coatings (one on the anode and another one on the cathode) for improved performance (e.g., to achieve better electrochemical stability on both electrodes, better mechanical strength or toughness, etc.). Alternatively, two different coatings may be deposited on one electrode, because in some cases they may offer technological advantages or reduce production cost. Also, in some designs it may also be advantageous to use a porous coating on the surface of at least one of the electrodes in addition to the use of a standalone membrane (e.g., in cases where a membrane and coating(s) complement each other's properties, such as electrochemical compatibility, strength, toughness, thermal stability, etc., or in cases where the use of both minimizes stresses in the system or provides other performance, cost, or safety benefits). The porous surface coating layer may be in the form of bonded (or sintered) particles. Spray coating or slurry-based deposition are examples of suitable low-cost methods that may be utilized for the formation of such a surface coating layer. The surface coating layer may comprise electrically insulating particles mixed with binders, similar or identical to those used for electrode construction.

In some designs, it may be advantageous to treat the surface of the porous surface coating layer or a porous separator or an electrode by using a plasma or a reactive gas. This process may improve wetting by the molten electrolyte as well as mechanical and conductivity properties of the interfaces (or interphase) with the solid electrolyte at cell operational temperatures.

In some designs, it may be advantageous to select a membrane material that at least partially dissolves into the electrolyte during the melt-infiltration process.

Commercial Li-ion batteries and conventional solid state Li batteries typically use Al foil as a current collector for the cathode and Cu foil as a current collector for the anode. One or both of such current collectors may react with the molten electrolytes during the melt infiltration process, inducing formation of undesired phases (which may be electrically isolative or induce mechanical separation of the electrode from the foils). In addition, cooling the electrolyte-infiltrated electrode down to room temperature may induce stresses at the electrode/current collector interface, which may lead to at least partial delamination of the electrode from the current collector.

The use of conductive carbon (e.g., carbon nanofibers, carbon whiskers, carbon nanotubes (such as single-walled, double-walled, and multi-walled carbon nanotubes), graphene, multilayered graphene, exfoliated graphite, graphite flakes, amorphous carbon, and their mixtures and composites, etc., and other forms of conductive carbon), nickel (or nickel alloy), steel, zirconium (or zirconium alloy), or titanium (or titanium alloy) based (or comprising) current collectors may be advantageous in some designs due to their improved compatibility with some of the electrolytes. Alternatively, Cu and Al foil current collectors may comprise a layer of a protective surface coating (preferably from around 1 nm to around 1 micron in average thickness). In some designs, such a protective layer may comprise: nickel, titanium, carbon, or carbon composite (e.g., carbon-ceramic or carbon-polymer composite, where a polymer is preferably sufficiently thermally stable to withstand melt infiltration with electrolyte (note that selected examples of suitable polymers are provided above in relation to the discussion of the polymer binder materials and polymer separator membranes); the polymer weight fraction may be in the range from around 0.1 wt. % to around 99.9 wt. %) or metal(s) or metal oxide(s). The carbon in the protective layer may comprise amorphous or disordered (turbostratic) carbon, graphitic carbon or carbon particles and nanoparticles of various shapes, size, and aspect ratios (e.g., carbon onions, carbon blacks, branched carbons, carbon nanofibers, carbon whiskers, carbon nanotubes (such as single-walled, double-walled and multi-walled carbon nanotubes), graphene, multilayered graphene, exfoliated graphite, graphite flakes, or porous carbons, etc.). Depending on the composition of the protective layer and current collector, this protective layer may be formed by using a spray-coating method, by a slurry-based deposition process, by an electrochemical or electrodeposition method, by a vapor-phase deposition (e.g., by CVD, ALD, etc.), by a sol-gel deposition, by a precipitation, or by using other suitable processes. This protective surface coating layer on a current collector (which may be in the form of a solid or porous foil, a foam or a mesh, etc.) may be deposited either before or after the electrode fabrication on the current collector surface.

Another suitable function of the coating on the current collector is to minimize the thermal stresses at the current collector/electrode interface. Metals typically exhibit higher thermal expansion than ceramic materials. As such, metal foil current collectors will typically compress more during cooling from the melt-infiltration temperatures. The use of a surface coating may reduce the stress concentration and improve stability of these solid electrolyte cells. Coatings comprising thermally stable polymers or carbon may be advantageous for this purpose. Furthermore, the presence of pores in such a coating may further assist in stress accommodation. Suitable porosity of the coating may range from around 0.1 vol. % to around 30 vol. %.

Electrodes in commercial Li-ion batteries are typically easily wetted by organic electrolyte and do not chemically react with organic electrolytes during the electrolyte-infiltration procedure. However, melt-infiltration of the solid state electrolytes (including, but not limited to those described by Eqs. 1-9 above) at elevated temperatures (e.g., in the range from about 200 to about 600° C.) may suffer from (i) poor wetting, (ii) undesirable reactions with typical active electrode materials (e.g., with many lithium metal oxides and metal fluorides), and (iii) interfacial stresses (e.g., originating during the cool down of the electrolyte-infiltrated electrode due to the difference in the thermal expansion coefficient of the current collector, electrode, and electrolyte). Several strategies may be employed to overcome these challenges. Active powders (or electrodes comprising active powders) may be coated with a thin surface layer that either improves wetting or protects the active particles during chemical reaction with molted electrolyte at elevated temperatures during the infiltration process, or reduces interfacial stresses, improves interfacial bonds, or serves several of such functions. This surface layer may preferably have sufficiently high permeability by Li ions in order to allow cell operation at high rates. Thus, the thickness and the composition of such a layer may depend on a particular electrode and electrolyte chemistry and particle size. The layer thickness typically does not significantly affect its wetting properties, unless it is partially consumed during the reaction with the electrolyte. A thinner layer may allow for a high rate performance, but may not provide sufficient protection. A thicker layer typically provides better protection, but slows down the rate capability and reduces the energy density of the cell (since this layer typically does not exhibit high Li capacity during charge). In most configurations and cell chemistries, a protective layer thickness from around 0.5 nm to around 200 nm has been found to work well.

The composition of the protective surface layer may be optimized for each electrode/electrolyte composition. A conductive carbon coating generally provides adequate protection, but may suffer from poor wetting by a molten electrolyte, unless it is further modified to contain a high concentration of defects at the surface, doped (e.g., with N or B, etc.), or coated by another (outer) ceramic (e.g., oxide or sulfide) layer. Thus, it may be advantageous for the surface coating to comprise several sub-layers of different morphology, structure, or composition (e.g., each sub-layer serving a different function). Various oxides (e.g., silicon oxide, zirconium oxide, zinc oxide, titanium oxide, magnesium oxides, etc.) and various metal sulfides (e.g., iron sulfide, titanium sulfide, molybdenum sulfide, zinc sulfide, etc.) typically work well as the protective and wetting-improvement layers. However, a particular selection needs to consider the type of electrode used. For example, some of the oxides (e.g., silicon oxide or titanium oxide) and most of the metal sulfides may react with Li if used for a low potential anode, inducing undesirable volume changes, which may lead to the degradation of the active material/electrolyte interface. Thus, for example, if silicon oxide is used as a coating for the anode material, its thickness may be kept to a minimal level (preferably to below 10 nm).

In some designs (e.g., when poor wetting or interfacial stresses are an issue), it may be advantageous for the surface layer coating to be porous (or, at least, partially porous). The pores in such a layer may be open or closed. A suitable pore size in this coating may range from around 0.3 nm to around 100 nm, depending on the size of active particles and the particular chemistry. A porous coating may reduce interfacial resistance and may improve the mechanical integrity of the electrodes (e.g., by minimizing interfacial stresses during the cooling down of the electrolyte-infiltrated electrodes or by providing improved adhesion to the electrolyte). The pores (when partially wetted by the electrolyte) may mitigate some of the stresses at the electrode/electrolyte interface. In addition, such a porous layer may improve wetting and minimize charge-transfer resistance. In some designs, at least some of the pores in such a porous layer may be pre-filled with Li salts (e.g., $Li_2S$, $LiF$, $LiI$, $LiCl$, $LiBr$, $Li_3N$, etc.), other metal salts, metal (nano)particles or solid electrolyte material. Such a procedure may also improve wetting and/or minimize charge-transfer resistance. In some designs, such a porous layer may exhibit high electron conductivity (e.g., greater than $0.01$ S $cm^{-1}$). In some designs, such a porous layer may comprise conductive carbon. In some designs, the mass fraction of carbon in the porous layer may range from 50 to 100%.

Figure 6A:
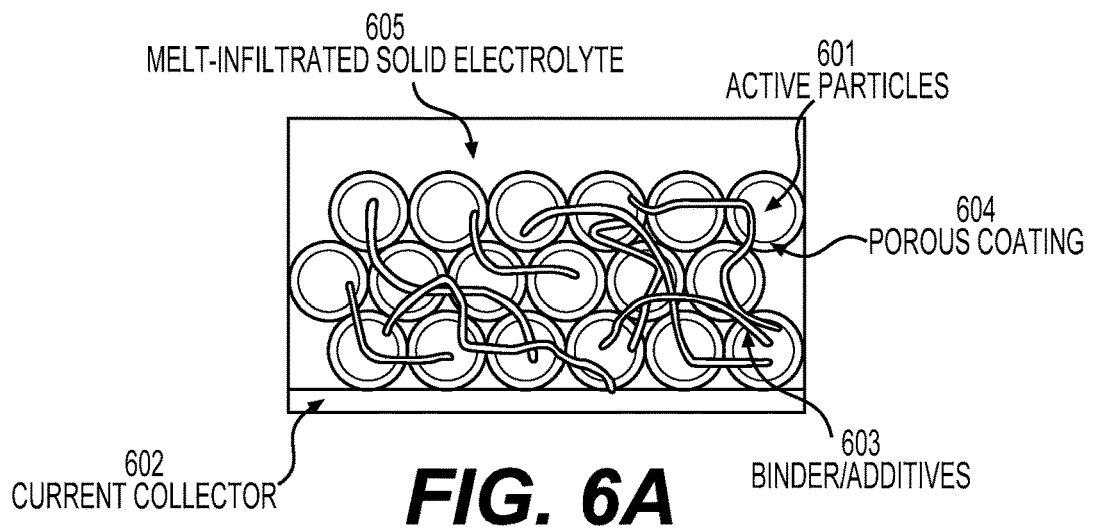
FIGS. 6A-6C illustrate one side of example electrodes melt-infiltrated with a solid electrolyte.
Figure 6B:
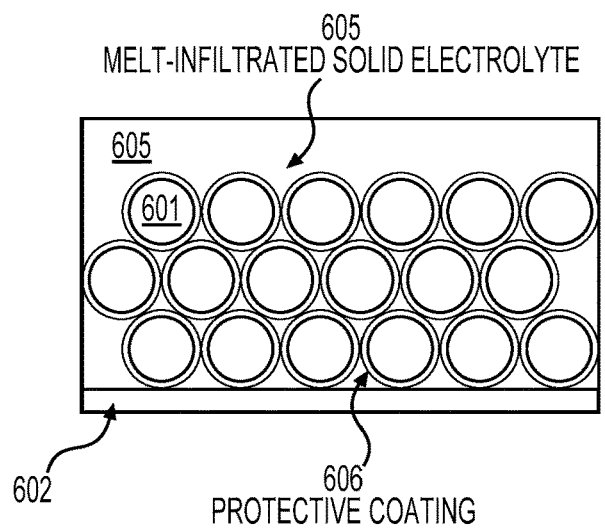
Figure 6C:
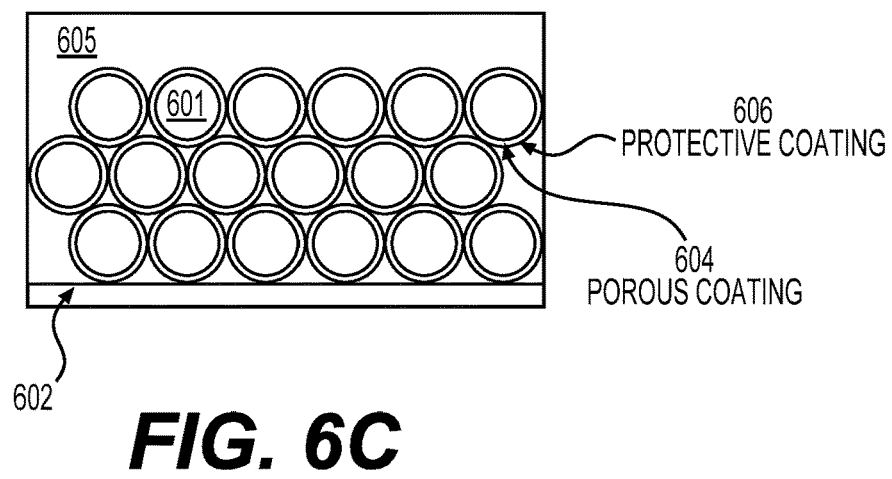

FIGS. 6A-6C illustrate one side of example embodiments of electrodes melt-infiltrated with a solid electrolyte. FIG. 6A illustrates a thermally stable electrode comprising active particles 601 coated with a porous layer 604 and also comprising conductive or other functional additives 603 (e.g., a binder, additives to improve electrolyte wetting or improve mechanical properties, etc.), all melt-infiltrated in a solid electrolyte 605 and disposed on a current collector 602. As described above, pores in the porous layer 604 may be partially filled with suitable functional (nano)particles (Li or other metal salts, metals, solid electrolytes, etc.). FIG. 6B illustrates a thermally stable electrode comprising active particles 601 coated with a protective layer 606 and also comprising conductive or other functional additives 603 (e.g., a binder, additives to improve electrolyte wetting or improve mechanical properties, etc.), all melt-infiltrated in a solid electrolyte 605 and disposed on a current collector 602. FIG. 6C illustrate a thermally stable electrode comprising active particles 601 coated with a surface layer (which, in turn, comprises both protective sub-layer 606 and porous sub-layer 604 coatings) and also comprising conductive or other functional additives 603 (e.g., binder, additives to improve electrolyte wetting or improve mechanical properties, etc.), all melt-infiltrated in a solid electrolyte 605 and disposed on a current collector 602. Depending on the application and particular cell composition, it may be advantageous for the porous sub-layer 606 to be disposed under the protective layer 604 or on the outer surface of the protective sub-layer 604, or both under and above. Similarly, depending on the cell composition, the protective sub-layer 604 may be disposed under the porous layer 606 or on the outer surface of the porous sub-layer 606, or both under and above. A protective layer may be deposited on individual active particles (including composite particles) or on the pre-assembled electrode.

Several methods may be used for the formation of a surface coating on the active materials (powders) or the electrodes. Examples of suitable coatings include, but are not limited to ALD, CVD, solgel, precipitation, electrodeposition, electroless deposition, polymer (more generally—organic) shell formation followed by its carbonization during heat treatment at elevated temperatures, to name a few.

Solid state battery cells (particularly those based on ceramic electrolytes) are typically inflexible and brittle, which may be undesirable for some applications. Typically, thicker cells exhibit higher energy density than thinner cells due to a reduced fraction of the packaging material. However, thicker cells become even less flexible. The present disclosure also provides mechanisms for overcoming these limitations and allows for the fabrication of solid state battery cells with enhanced flexibility and toughness without significant sacrifices in energy density. Furthermore, in some designs, the disclosed configurations further enhance power density of the cells.

As an example, a relatively thick (but planar, e.g., pouch-type) solid state battery cell can be configured to accommodate bending by sliding thinner (and sufficiently flexible) individual (and mechanically de-coupled) building block layers relative to each other. Maintaining electrical connectivity between the individual "building blocks" during the sliding process has been found to be more straightforward than maintaining ionic connectivity. As such, each thin building block may have a current collector layer on each side so that the current collector layers in the adjacent building blocks may slide relative to each other during bending, while allowing for electron transport between similar building block electrodes (e.g., between the cathodes or between the anodes). A similar concept may also be utilized for batteries with liquid electrolytes in order to enhance their flexibility with minimal sacrifices in cycle life and performance.

Figure 7A:
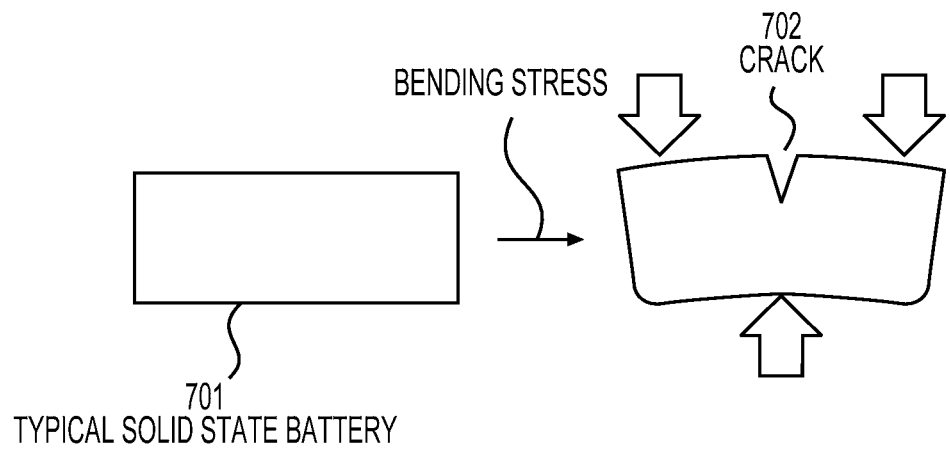
FIGS. 7A-7D illustrate different aspects of example flexible solid state battery compositions.
Figure 7B:
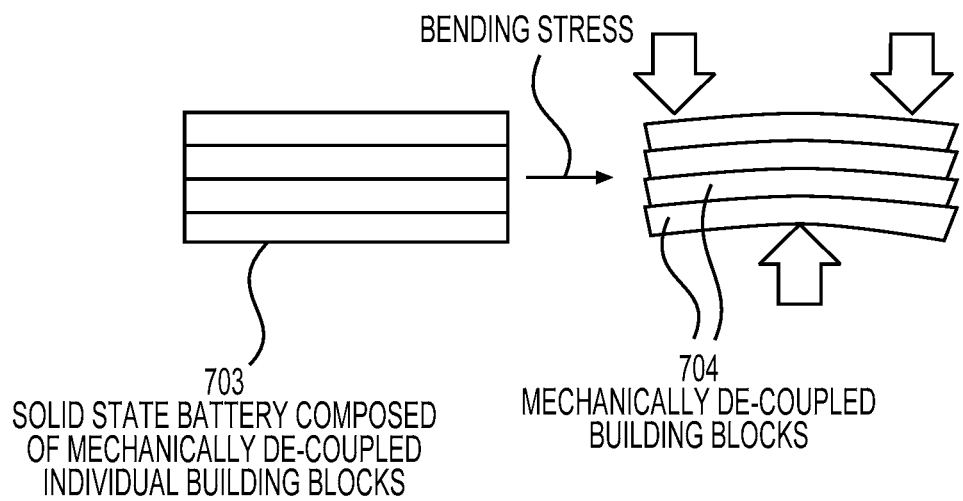
Figure 7C:
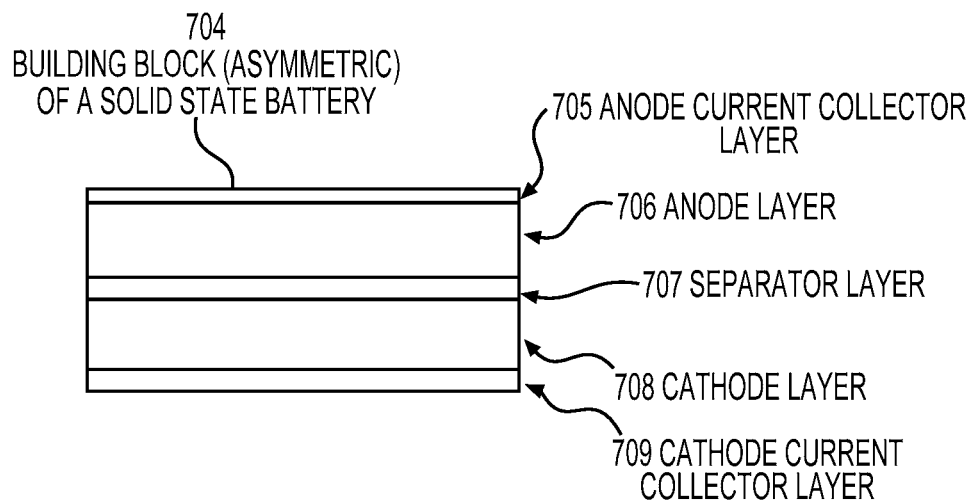
Figure 7D:
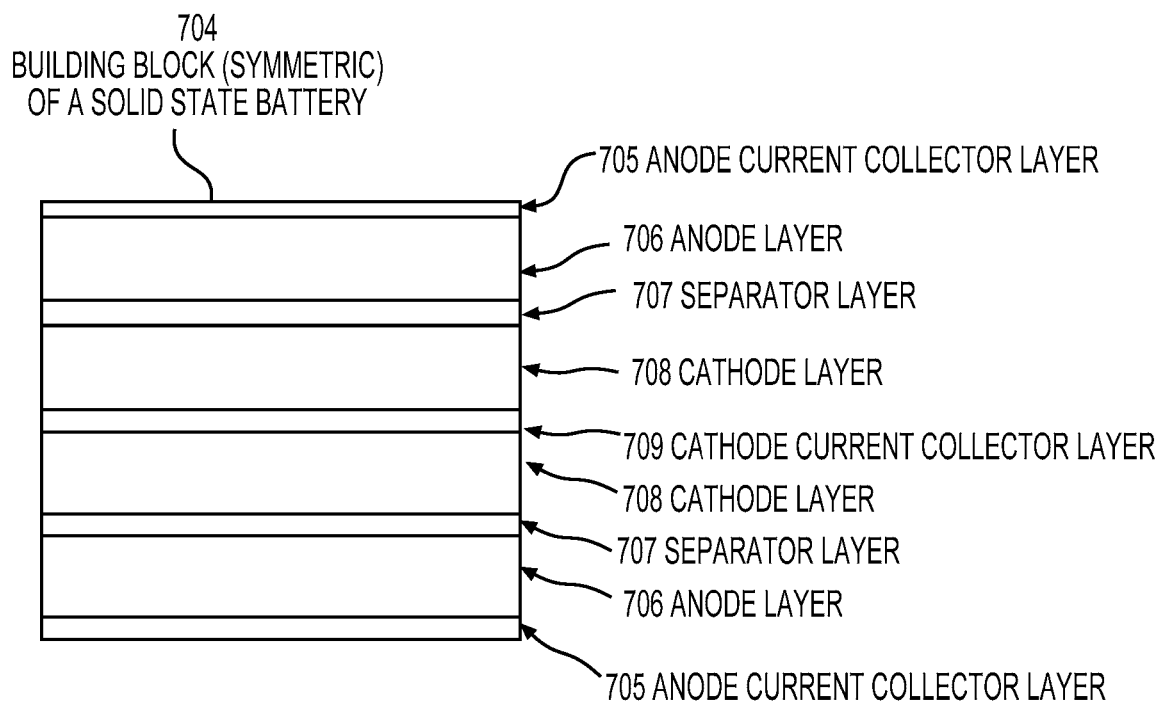

FIGS. 7A-7D illustrate several aspects of example flexible solid state battery compositions. FIG. 7A shows the formation of cracks 702 in a typical brittle solid state cell 701 upon bending. Formation of such mechanical defects typically leads to failure of the cell. FIG. 7B, in contrast, shows a solid state cell 703 composed of largely mechanically de-coupled individual building block layers 704, which may accommodate bending by sliding relative to each other. As such, this cell architecture greatly improves cell flexibility and mechanical stability. The thickness and number of the sub-layers in each individual (mechanically de-coupled) building block may vary, depending on its mechanical properties and the desired flexibility of the cell. FIG. 7C shows an example embodiment of a flexible thin building block 704 (asymmetric in this example) comprising the following five sub-layers: anode current collector 705/anode 706/separator 707/cathode 708/cathode current collector 709. When assembling such building blocks into the cell, the orientation of the blocks should vary so that the positive electrode current collector layers are in contact with each other and the negative current collector layers are in contact with each other. FIG. 7D shows another example embodiment of a flexible thin building block (symmetric) 704 comprising more (e.g., nine) sub-layers: anode current collector 705/anode 706/separator 707/cathode 708/cathode current collector 709/cathode 708/separator 707/anode 706/anode current collector 705. Another example embodiment of a flexible thin building block (symmetric) may comprise a cathode current collector outside/cathode current collector/cathode/separator/anode/anode current collector/anode/separator/cathode/cathode current collector. In some configurations, a conductive lubricant (e.g., comprising carbon particles) may be used between the individual building blocks in order to further enhance cell flexibility and enhance its mechanical robustness. In yet other configurations, a lubricant may be selected not to be conductive because current collectors could be electrically connected at the tab area. Examples of non-conductive solid lubricant include, but are not limited to, low-friction metal sulfides (e.g., $MoS_2$, $WS_2$, etc.), boron nitride (BN), polytetrafluoroethylene, rare-earth fluorides, and others.

If a solid electrolyte of such a cell is introduced via a melt-infiltration process, it may be advantageous to prevent this electrolyte from infiltrating the interface between the individual building blocks. For this process the building blocks may be temporarily connected/closed at the edges. Such temporary connections may be broken/removed after the electrolyte infiltration. In another embodiment, the interface between the building blocks may be selected/designed to prevent wetting by the electrolyte so that the electrolyte does not fill this space and does not mechanically connect (and preferably does not electrically disconnect) the building block layers. If a solid electrolyte of such a cell is introduced via a melt-infiltration process and if a suitable lubricant (e.g., carbon-based) is used to electrically connect the building blocks, it may be important to select the composition of this lubricant to withstand the temperature of the melt-infiltration process. In yet another embodiment, the interface between the building blocks may be compressed (at least at the edges) to the level when virtually no porosity is available at the edges for electrolyte infiltration into the space between the mechanically de-coupled building blocks.

A similar approach of using building blocks and using a lubricant layer (e.g., at the interface between the current collector foils) between the building blocks may also be utilized in order to enhance flexibility of batteries comprising liquid or polymer electrolytes. In some configurations (particularly if used in cells comprising a liquid electrolyte), the dry lubricant coatings may preferably be stable against oxidation during cell operation (or retain sufficient tribological/lubricating properties even after oxidation) if used at the cathode current collector and may preferably be stable against reduction during cell operation (or retain sufficient tribological/lubricating properties after reduction) if used on the anode current collector. For liquid electrolytes, a porous lubricating layer may also be used at the electrode/separator interface(s).

In some configurations, it may be advantageous to utilize carbon nanotubes (particularly conductive single-walled carbon nanotubes) as additives in the electrodes of the solid state cells in order to achieve robust electrical contact between the individual particles of the active material upon bending or other mechanical stresses/strains during cell fabrication or utilization. In some configurations, it may also be advantageous to utilize non-carbonaceous nanowires, nanotubes, nanoribbons or platelets (e.g., made of BN, $Al_2O_3$, SiC, and other ceramic materials) in the electrodes as additives to enhance their mechanical properties (such as fracture toughness). In some configurations, it may also be advantageous to utilize preferably electrically isolative nanowires, nanotubes, nanoribbons or platelets (e.g., made of BN, $Al_2O_3$, SiC, and other ceramic materials) as additives in the solid electrolyte (separator layer) to enhance its mechanical properties (such as fracture toughness). In some configurations, the use of nanowires, nanotubes, nanoribbons (and other one dimensional, 1D, elongated structures) may be more preferential than the use of platelets (two dimensional, 2D, structures) because a 2D structure may slow down ion transport within a cell and reduce its rate capabilities. Yet, the introduction of holes into such platelets may (at least partially) overcome this limitation.

Typical cells infiltrated with a liquid electrolyte contain no remaining porosity between the active electrode particles. However, in some configurations, solid state cells produced by infiltration of the electrolyte melt may benefit from some of the remaining (inter-particle) porosity because it may assist in accommodating some of the stresses occurring during cell fabrication (e.g., thermal stresses) or during cell use (e.g., cell bending). The useful volume fraction of the remaining pores may depend on the cell configuration, electrode thickness, composition and microstructure of the electrode, electrolyte, and separator layers, and may range from around 0 (zero) to around 5 vol. %. A larger volume fraction may also be used, but it typically reduces energy density and power density of the solid electrolyte cells.

The use of elongated (e.g., 1D) particles (e.g., nanowires, nanotubes, nanoribbons, etc.) of active material in the electrodes filled with a solid electrolyte (including but not limited to the solid electrolytes described by Eq. 1-9 above or other solid electrolytes that may be melt-infiltrated into the electrodes) may be advantageous in the context of the present disclosure. In some configurations, such 1D particles may be connected into threads, fabrics (woven or nonwoven), mats, meshes, or other material architectures that comprise elongated building blocks. In this case the electrode properties (including mechanical properties) may be further enhanced in some designs. In some configurations, the active material may be deposited on the surface of either the individual or interconnected 1D particles of another material (referred to herein as "inactive") that exhibits significantly (e.g., at least three times) lower ion storing capability during cell operation, but offers other attractive features (e.g., good mechanical properties, high electrical conductivity, or simpler, lower-cost formation into 1D shapes, etc.). Such active material deposition may be conducted by one of the suitable vapor deposition methods (e.g., by CVD, ALD, vapor infiltration, etc.) or wet deposition methods (e.g., by sol-gel, electroless deposition, spraying, dip-coating, etc.) or by other suitable routes. The volume fraction of the active-to-inactive material may preferably exceed 2 (or more preferably exceed 4 and even more preferably exceed 9) in order to achieve high energy density in the cell. The shape of the active particles may further enhance the mechanical properties and performance of cells with solid electrolytes. The use of platelet-shaped (2D) particles of active material instead of the 1D structures may similarly be advantageous in terms of mechanical performance. However, 2D structures may slow down ion transport within a cell and reduce cell rate capabilities. Introduction of holes into such platelets may (at least partially) overcome this limitation.

The use of solid electrolytes with high energy so-called "conversion reaction" based cathodes and anodes has been conventionally hindered by the inability of ceramics to accommodate the volume changes that take place during charge and discharge cycling. This applies to rechargeable metal and metal-ion batteries (such as Li and Li-ion batteries) comprising conversion-type electrodes. During insertion of Li into the interstitial positions of so-called "intercalation" compounds, no changes in the chemical bonding and very little change in volume takes place. In contrast, during insertion of Li into conversion-type electrode materials, these materials convert from one state to another state, which is accompanied by significant changes in chemical bonding, crystal structure, and volume. The present disclosure describes advanced solid state batteries that may utilize "volume changing," "high capacity," conversion-type active materials in anodes or cathodes, or both.

For applications of rechargeable Li and Li-ion batteries comprising solid electrolytes, suitable "volume changing" conversion-type active materials may include, but are not limited to, the following: (i) conversion-type electrodes, such as various metal fluorides (such as lithium fluorides (e.g., LiF), iron fluorides ($FeF_3$ or $FeF_2$), manganese fluoride $MnF_3$, cobalt fluoride ($CoF_3$ or $CoF_2$), cupper fluoride $CuF_2$, nickel fluoride $NiF_2$, lead fluoride $PbF_2$, bismuth fluorides ($BiF_3$ or $BiF_5$), tin fluoride ($SnF_2$ or $SnF_4$), antimony fluorides ($SbF_3$ or $SbF_5$), cadmium fluoride $CdF_2$, zinc fluoride $ZnF_2$, and other metal fluorides), various metal chalocogenides (such as lithium sulfide $Li_2S$, lithium selenide $Li_2Se$, lithium telluride $Li_2Te$, and others); (ii) various conversion-type metal chlorides (such as lithium chlorides (e.g., LiCl), iron chlorides ($FeCl_3$ or $FeCl_2$), manganese chloride $MnCl_3$, cobalt chloride ($CoCl_3$ or $CoCl_2$), copper chloride $CuCl_2$, nickel chloride $NiCl_2$, lead chloride $PbCl_2$, bismuth chlorides ($BiCl_3$ or $BiCl_5$), tin chlorides ($SnCl_2$ or $SnCl_4$), antimony chlorides ($SbCl_3$ or $SbCl_5$), cadmium chlorides $CdCl_2$, zinc chlorides $ZnCl_2$, and other metal chlorides); (iii) conversion-type metal bromides (such as lithium bromide LiBr); (iv) conversion-type metal iodides (such as lithium iodide LiI); (iv) various conversion-type mixed metal fluorides, mixed metal chlorides, mixed metal bromides, mixed metal iodides, mixed metal halides (a mixture of two or more metal halides, such as $CuF_2$ and $FeCl_2$ or $CuF_2$ and $FeF_3$, etc.); (v) various oxihalides; (vi) various other conversion-type electrodes, their combination and mixture (e.g., sulfides, oxides, nitrides, halides, phosphides, hydrides, etc.); (vii) mixtures and combinations of intercalation-type Li-ion battery active materials and conversion-type active materials; and (viii) various high capacity (as described above) intercalation type active materials with high melting points (as described above). It will be appreciated that these conversion-type active materials may be utilized in both Li-free or partially lithiated or fully lithiated state(s). In some cases, the use of partially or fully lithiated state(s) of active materials may be particularly advantageous for a selected synthesis process (e.g., if only the lithiated state is sufficiently stable for a particular processing/synthesis route). It will be appreciated that partially or fully lithiated conversion-type active materials may be composites. In some examples such composites may comprise metals. For example, if metal halides (e.g., $CuF_2$ or $FeF_3$ or others) are fully lithiated they become a mixture (composite) of a lithium halide (e.g., LiF in the case of metal fluorides) and metal clusters (or nanoparticles) of the corresponding metal fluoride (e.g., Cu, Fe, or a Cu—Fe mixture in the case of $CuF_2$, $FeF_3$, or a $CuFe_2$—$FeF_3$ mixture).

For applications of rechargeable Li and Li-ion batteries comprising solid electrolytes, suitable "volume changing" conversion-type active materials may also include, but are not limited to, the following: various chemical transformation-type anode materials, such as oxides and hydrides of silicon Si, germanium Ge, tin Sn, aluminum Al, lead Pb, antimony Sb, magnesium Mg, phosphorous P, and others, and various alloying-type (where Li electrochemically alloys with an anode during Li insertion) anode materials (which may be considered a version of the conversion type electrode materials), such as (i) silicon Si, germanium Ge, tin Sn, aluminum Al, lead Pb, antimony Sb, magnesium Mg, phosphorous P, and others; (ii) various binary Si (or Sn, Ge, Al, Mg, etc.) alloys (or mixtures) with other metals; (iii) various ternary Si (or Sn, Ge, Al, Mg, etc.) alloys (or mixtures) with metals; and (iv) other metals and metal alloys that form alloys with Li. It will be appreciated that that these materials may be doped or heavily or "ultra-heavily" doped; in the case of Si, for example, heavily and ultra-heavily doped silicon include silicon doped with a high content of Group III elements, such as boron B, aluminum Al, gallium Ga, indium In, or thallium Tl, or a high content of Group V elements, such as nitrogen N, phosphorus P, arsenic As, antimony Sb, or bismuth Bi; by "heavily doped" and "ultra-heavily doped," it will be understood that the content of doping atoms is typically in the range of 3,000 parts per million (ppm) to 700,000 ppm, or approximately 0.3% to 70% of the total composition. It will be understood that Group IV elements used to form higher capacity anode materials may include Ge, Sn, Pb, and their mixtures (e.g., various alloys or mechanical mixtures), or composites, with the general formula of $Si_a$—$Ge_b$—$Sn_c$—$Pb_d$—$C_e$-$D_f$, where a, b, c, d, e, and f may be zero or non-zero, and where D is a dopant selected from Group III or Group V of the periodic table. For binary silicon alloys (or mixtures) with metals, the silicon content may be in the range of approximately 20% to 99.7%. Examples of such alloys (or mixtures) include, but are not limited to: Mg—Si, Al—Si, Ca—Si, Sc—Si, Ti—Si, V—Si, Cr—Si, Mn—Si, Fe—Si, Co—Si, Ni—Si, Cu—Si, Zn—Si, Sr—Si, Y—Si, Zr, —Si, Nb—Si, Mo—Si, Tc—Si, Ru—Si, Rh—Si, Pd—Si, Ag—Si, Cd—Si, Ba—Si, Hf—Si, Ta—Si, and W—Si. Such binary alloys may be additionally doped (or heavily doped) with Group III and Group V elements. Alternatively, other Group IV elements may be used instead of silicon to form similar alloys or mixtures with metals. A combination of various Group IV elements may also be used to form such alloys or mixtures with metals. For ternary silicon alloys (or mixtures) with metals, the silicon content may also be in the range of approximately 20% to 99.7%. Such ternary alloys may be doped (or heavily doped) with Group III and Group V elements. Other Group IV elements may also be used instead of silicon to form such alloys or mixtures with metals. A combination of various Group IV elements may also be used to form such alloys or mixtures with metals. Examples of other metals and metal alloys that form alloys with lithium include, but are not limited to, Mg, Al, Ga, In, Ag, Zn, Cd, etc., as well as various combinations formed from these metals, their oxides, etc.

It will be appreciated that these conversion-type active materials (in cathodes or even in anodes) may be utilized in Li-free or in partially lithiated or in fully lithiated states.

For other metal-ion (non-Li) battery applications, suitable "volume changing," "high capacity," and "high melting point" active materials may include materials similar to those described above, but where other metal ions are used instead of Li. For example, for a Na-ion battery, LiBr may be replaced with NaBr as a high capacity, volume changing, high melting point active material.

The present disclosure provides favorable compositions and favorable architectures of the conversion-type electrodes (including alloying-type anodes) in the form of composites (or nanocomposites) for use with the solid electrolytes in solid state rechargeable metal and metal-ion batteries.

To allow for the conversion-type active (anode or cathode) materials to be used with solid electrolyte it may be advantageous to use them in the form of composite particles additionally comprising another material, which may be referred to herein as a "scaffolding," "skeleton," or "framing" matrix material, that experiences small (preferably 8 vol. % or below) volume changes during insertion of active (e.g., Li) ions into the composite. It may be also advantageous for the scaffolding material to possess both sufficient ionic and sufficient electrical conductivities to permit reasonably fast (for a given application) charging and discharging. In some configurations, it may be favorable for the scaffolding material to additionally store charge (ions) and be "active," while exhibiting small volume changes (preferably less than approximately 8 vol. %) during charging and discharging.

For cases where the active material undergoes significant expansion during cell operation from the state of the material during particle synthesis, it may be advantageous to provide sufficient pore volume within the "scaffolding material/active material" composite to accommodate from around 50 vol. % to around 100 vol. % (typically the higher the better) of such a volume expansion without causing composite particle fractures. In an ideal case, the composite particles may be designed to experience minimal volume changes at the particle level (e.g., below 8 vol. %, typically the smaller the better) when cycled with a solid electrolyte. It thus may be advantageous for the scaffolding material to possess a sufficient elastic modulus, mechanical strength, and toughness in order to avoid fractures and failures during the battery cycling-induced volume changes in the high capacity active material and to minimize the volume changes at the composite particle level.

The scaffolding (framing) matrix may also be used to electrically connect individual active (nano)particles, which can be important for higher utilization of the active particles. Furthermore, the scaffolding matrix may be capable of maintaining such electrical connectivity even in cases when the active particles change dimensions during insertion and extraction of ions (during battery operation, such as during charging and discharging).

It may be advantageous for the scaffolding (framing) matrix material (or at least a portion of the scaffolding matrix material) to form a unibody or a single solid particle (for example, where the scaffolding matrix material atoms are linked via chemical bonds) within a single scaffolding matrix material/active material composite particle (as opposed to a weak agglomeration of individual scaffolding matrix material particles within a single composite particle). In this case, the composite may exhibit significantly higher robustness during handling and battery operation (particularly because of the volume changes in the volume-changing active material).

As described above, the scaffolding matrix material can be selected as a porous material. The pores in this matrix can be either completely filled with the high capacity active material (e.g., when no additional space is needed for volume expansion) or partially filled with the high capacity active material (e.g., when additional pore space is needed to accommodate the volume expansion during charge-discharge cycling).

The pores in the scaffolding matrix may either be closed or open (interconnected). When direct contact between the electrolyte and active material is not desired (for example, when it leads to degradation of the active material or formation of undesirable interphase material during the cell fabrication or a cell operation), the following configurations may be advantageous: (i) most of the pores in the scaffolding matrix material are closed; (ii) several or more interconnected/open pores in the scaffolding matrix material are closed together (in some configurations, all the interconnected pores within a single particle may be enclosed in an electrolyte-impermeable but active ion permeable shell, discussed in more detail below); or (iii) the pores may be plugged with another material, which may be used to isolate (at least a majority of) the active material (infiltrated into the scaffolding matrix material) from direct contact with the electrolyte.

The scaffolding material may be sufficiently permeable to electrolyte ions participating in the charge storage (such as Li ions in the case of a Li-ion battery). In this case, even when either (i) no open (no interconnected) pores exist in the scaffolding matrix material, (ii) the pores are interconnected but not accessible to the electrolyte (e.g., when an additional ion-permeable shell prevents the electrolyte from penetrating into the scaffold or when the pores are plugged with another material), or (iii) the diffusion coefficient of the active material for the active ions participating in the charge storage is low (e.g., less than about $10^{-11}$ cm$^2$/S), it may be important for the ions from the electrolyte to reach all the matrix-encapsulated, high-capacity active material in an amount of time sufficient to maintain reasonable (for a given application) charge and discharge rates. This will determine the minimum sufficient ionic mobility (diffusion coefficient) and ionic conductivity for the scaffolding matrix of the above-described composites. The value of the minimum ionic conductivity of the scaffolding matrix depends on the size of the composite particles, thickness of the scaffolding matrix walls, ionic resistance of the active material/scaffolding matrix interface and other parameters of the system. In most practical cases, it is desirable for the scaffolding matrix to be sufficiently conductive to maintain at least 50% of the maximum discharge capacity of the composite at a discharge rate of "1 C" (which corresponds to the current density capable of discharging the electrode material within 1 hour, if the electrode material provides its full capacity).

In some designs, conversion-type active (anode or cathode) materials in the form of composite particles (with the above-discussed "scaffolding," "skeleton," or "framing" matrix material) may experience substantial volume changes during the first cycle (sometimes as large as 140 vol. %) and much smaller volume changes (e.g., 3-30 vol. %) during the subsequent cycles. In order to accommodate these large volume changes during the first (or the first few) cycle(s) in cells comprising solid electrolytes (including but not limited to those described above in Eq. 1-9), it may be advantageous to conduct them at elevated temperature where the solid electrolyte is either soft or molten. Therefore, a sufficiently high ionic conductivity of the solid electrolyte in a molten state may be particularly advantageous.

FIGS. 8A-8D illustrate example composite particle compositions according to certain example embodiments. The compositions generally comprise various scaffolding matrix materials 802, 803, 804, and high-capacity active material 801 confined within the scaffolding matrix 802, 803, 804. In some designs, the particle compositions may retain certain unfilled space forming pores 805. FIG. 8A illustrates a closed pore scaffolding matrix particle with pores substantially fully filled with the high-capacity active material 801. In this case, the scaffolding matrix material 802 is permeable to active ions (such as Li ions in the case of a Li-ion battery). FIG. 8B illustrates a closed pore scaffolding matrix particle with pores partially filled with the high-capacity active material 801 (and thus leaving some unfilled pores 805). In this case, the scaffolding matrix material 802 is still permeable for active ions (such as Li ions in the case of a Li-ion battery) but additional pore volume is available for expansion of the active material 801 during electrochemical reactions (battery cycling). FIG. 8C illustrates a closed pore scaffolding matrix particle filled with the high-capacity active material 801, but where the scaffolding matrix material 803 is porous and may either accommodate volume expansion and/or be at least filled with electrolyte. Porous carbon (e.g., produced by carbonization of a polymer precursor) is an example of such a matrix material. FIG. 8D illustrates an open pore scaffolding matrix particle with the pores 805 partially filled with the high-capacity active material 801. In this case, the pores within the scaffolding matrix material 804 are interconnected.

It will be appreciated that the different composite particle structures provided herein can be formed in a variety of ways. Several example methods of fabrication for an active material infused scaffolding matrix are described below. The fabrication techniques allow efficient and controlled incorporation of nanoparticles of electrochemically active high capacity battery materials with high melting points, for example, or with no melting point (when the materials would simply decompose at high temperature), into a porous scaffolding matrix, such as a carbon matrix or a thermally stable polymer matrix by way of example.

In one example, active material may be introduced into pre-fabricated porous scaffolding matrix (e.g., carbon) particles via chemical vapor deposition (CVD), atomic layer deposition (ALD), or other vapor deposition techniques. Porous carbon particles may be fabricated by chemical synthesis or precipitation-driven fabrication, or a combination of chemical and precipitation methods of polymeric precursor particles, their pyrolysis (thermal treatment) and activation (partial oxidation to introduce or increase the volume of interconnected pores). Desired pore sizes and their distribution may be achieved, for example, by a combination of porosity in the polymer precursor and a carbon activation process. Another way to produce porous carbon scaffolds includes synthesis of a large polymer monolith, its carbonization, and mechanical grinding of the carbon monolith into particles of the desired shape. The activation process may involve physical oxidation with oxygen-containing gases (such as $CO_2$, $H_2O$, air, $O_2$, etc.), chemical activation (e.g., with KOH, $KNO_3$, $ZnCl_2$, $Zn(NO_3)_2$, $Zn_3(PO_4)_2$, $H_3PO_4$, or other suitable chemicals), or a combination of these approaches. According to another example method, active particles may be introduced into a pre-fabricated porous (e.g., carbon) scaffolding matrix via vapor infiltration and/or capillary condensation. This approach may be particularly attractive for materials that have high vapor pressures (e.g., greater than about 0.1 Pa) at moderately high temperatures (e.g., less than about 1000° C.).

According to another example method, active particles may be introduced by: (i) dissolving active particles or active particle precursors in a solvent; (ii) infiltration of the solution into the pores of a pre-fabricated porous (e.g., carbon) scaffolding matrix under normal pressure, at increased pressure, or under vacuum; (iii) evaporation of the solvent; and (iv) (if needed) transformation of the precursor into the active particles (for example, upon heating or upon reaction with a reactive gas or liquid). In some cases, some of the above steps may be repeated to increase the total amount of the introduced nanoparticles of active material into the porous carbon matrix.

For simplicity and because of the most typical use in commercial batteries, the above-described shapes of active particles are shown as near-spherical or random. However, it will be appreciated that 1D (nanotube, nanowire, nanoribbons, etc.) or 2D (platelets) shapes of the composite particles may be advantageous in some designs of the present disclosure.

The present disclosure also provides an improved architecture of such composites, where each active particle comprises a shell at least partially encasing the active material, the shell being substantially permeable to the Li ions stored and released by the conversion-type active material(s). Such a shell may serve several important functions, such as (i) prevention of electrolyte filling into the porous structure of the composites, (ii) protection of the active materials during undesirable reaction with the electrolyte during cell assembling or operation, (iii) reduction in the charge transfer resistance, (iv) enhancement in the wettability of the electrodes by the electrolyte, (v) accommodation of the stresses at the electrode particles/electrolyte interface during cycling, and (vi) physical constrain to reduce volume changes in active composite particles during the volume changes in active material, to name a few.

The shell may comprise a protective layer formed from a material that is substantially impermeable to the electrolyte, but permeable to active electrolyte ions (e.g., Li ions for rechargeable Li or Li-ion solid electrolyte cells). The thickness of the shell may range from about 1 nm to about 10 microns. In some applications where maximum energy density is desired, the shell thickness may preferably comprise from about 0.05% to about 20% of the radius of the composite particles.

The shell may comprise carbon. The shell may also be solely made of mostly graphitic ($sp^2$-bonded) carbon or have an outer layer composed of graphitic (electrically conductive) carbon. The shell may comprise an active (Li storing) material layer, where the active material layer is formed from a different active material than in the core of the particles. The shell may comprise an intercalation-type active material, where accessible Li capacity of the intercalation material in the potential range of the cathode operation in a cell may range from about 0.1 mAh/g to about 300 mAh/g (where the low capacity may originate from Li intercalation in a different potential than that of the cathode operation). Examples of suitable lithium intercalation-type materials may include, but are not limited to various materials having a layered, spinel, olivine or tavorite crystal structure (such as lithium cobalt oxide, various lithium manganese oxides, various lithium nickel cobalt manganese oxides, various lithium cobalt aluminum oxides, various lithium polyanion compounds, such as various lithium phosphates, various lithium silicates, various other lithium compounds that comprise, for example, large ($XO_4$, where X may be P, Si, As, Mo, W, S, etc.) anions, including those that comprise F in their crystal structure). The shell may also comprise a Li-free intercalation-type material, which is stable in the potential range of the core-shell cathode operation. Examples of suitable Li-free intercalation-type materials may include but are not limited to various oxides, nitrides, and sulfides, to name a few. The active material of the active material layer may have a substantially lower capacity relative to the active fluoride material. As another example, the shell may comprise a porous layer having a smaller average pore size than the skeleton matrix material. Pores in the porous layer of the shell may be at least partially infiltrated with a metal fluoride, including a lithium fluoride. In another example, the pores in the porous layer of the shell may be at least partially filled with intercalation-type active material. In another example, the pores in the porous layer of the shell may be at least partially filled with a material that does not undergo conversion reaction within the potential range of the cathode operation. As another example, the shell may be a composite material comprising an inner layer and an outer layer. The inner layer may be a porous layer, for example, having a smaller average pore size than the skeleton matrix material, and the outer layer may be, for example, (i) a protective layer formed from a material that is substantially impermeable to electrolyte solvent molecules or (ii) an active material layer formed from an active material that is different from the active material (such as lithium fluoride material intermixed with specific metal clusters or metal nanoparticles) in the bulk of the composite particles. As another example, the shell may be a composite material comprising two or more materials arranged in an interpenetrating configuration such that each of the materials of the composite material contacts the lithium fluoride or the skeleton matrix material (if present). As another example, at least the top layer of the shell may comprise conductive carbon. In yet another example, the shell may have gradually changing composition from the surface towards the center of the composite particles. In some configurations (e.g., when stress accommodation is desired) the shell may comprise pores.

In some designs, each composite particle may further comprise external channel pores extending from an outer surface of the skeleton matrix material towards the center of the skeleton matrix material, providing channels for solid electrolyte melt-infiltration and thus fast diffusion pathways for the ions into the active material disposed within the skeleton matrix material. At least some portion of the external channel pores may be filled with (i) a porous material having a different microstructure than the skeleton matrix material, (ii) an active material that does not undergo conversion reaction in the potential range of the composite cathode operation, and/or (iii) a solid electrolyte material. The surface of the external channel pores may be coated with a thin (from about 0.3 to about 50 nanometer) layer of (i) electrically conductive material, (ii) an active material that does not undergo conversion reaction in the potential range of the composite cathode operation, and/or (iii) a solid electrolyte material.

FIGS. 9A-9E illustrate example composite particle compositions according to certain example embodiments, comprising protective shells 903. FIGS. 9A and 9B illustrate example composite core-shell particles comprising a scaffolding matrix 902 and high capacity active material 901 filling the pore space of the scaffolding matrix 902, where the scaffolding matrix 902 or the active material 901 may change composition or microstructure from the center to the perimeter of the composite particles. FIGS. 9C and 9D illustrate example composite core-shell particles comprising the scaffolding matrix 902 and high capacity active material 901 only partially filling the pore space of the scaffolding matrix 902. FIG. 9D illustrates an example composite core-shell particle, where the shell 904 comprises a porous portion (which may be a part of the porous scaffolding matrix material). FIG. 9E illustrates an example core-shell particle comprising either intercalation-type active material 905 or high capacity conversion material 901 in a fully expanded state enclosed in a protective or a functional shell 903.

In some designs, the protective coating(s) or coating(s) may be deposited from a vapor phase via vapor deposition methods. Examples of such methods include, but are not limited to, chemical vapor deposition (CVD), atomic layer deposition (ALD), plasma-enhanced ALD, plasma-enhanced CVD, vapor infiltration, and others. For some designs, the protective material may be deposited from a solution. Examples of suitable methods include sol-gel, layer-by-layer deposition, polymer adsorption, surface initiated polymerization, nanoparticles adsorption, spray drying, and others. In some designs, the shell formation may involve multiple steps, where initially the shell precursor is first deposited conformably in a solution and then is transformed (at least, in part) into the shell material via thermal decomposition and/or chemical reaction. In some designs, multiple approaches may be combined in order to produce conformal, essentially defect-free shells around individual particles. In some designs, shells may be deposited electrochemically.

The use of the melt-infiltration method may be particularly attractive for the formation of solid state batteries with the above-discussed porous composite particles. This is because in contrast to high energy milling and mixing (processes used in typical solid state battery constructions) the melt-infiltration process introduces much less mechanical stresses to the composite particles and prevents their collapse or undesirable mechanical damages to the particles or to the particles' shells.

Liquid electrolyte-comprising Li-ion battery cells typically do not utilize high voltage cathodes and typically are not charged above around 4.45 V because of the undesirable oxidation of the suitable liquid electrolytes at such high cathode potentials. Those liquid electrolytes that are stable at higher potentials are typically not compatible with low potential Li-ion anode materials (such as graphite, silicon, tin, or lithium, to provide a few examples). This low voltage limits the attainable energy density of the rechargeable Li or Li-ion cells with liquid electrolyte. Conventional solid state Li-ion batteries typically utilize a Li metal anode instead of the graphite anode due to poor graphite/solid electrolyte contact and poor compatibility of the typical solid electrolytes with many low potential Li-ion anode materials (such as graphite or silicon). However, the use of Li metal foil anodes limits the power performance of such cells because of the slow kinetics of the plating process and, additionally, induces undesirable thickness changes in the cells during operation. The use of the melt-infiltration method for the formation of solid state Li-ion batteries may provide a unique opportunity to utilize both low potential anode active materials (such as graphite, silicon, tin, or lithium, to provide a few examples) in combination with high voltage active cathode materials that may be charged to above 4.5 V vs. Li/Li$^+$. In this case both the rate performance and the energy density may be maximized. Examples of suitable (in the context of the present disclosure) high voltage cathode materials include, but are not limited to a range of materials with an average Li extraction potential above around 3.9 V vs. Li/Li$^+$, such as lithium cobalt phosphate (LCP), lithium nickel phosphate (LNP), various tavorite structure materials (such as various polyanion compounds, for example, those with the formulas $Li_xM1_yM2_{1-y}(XO_4)F$; $Li_xM1_yM2_{1-y}(XO_4)OH$ or $Li_xM1_yM2_{1-y}(YO_3)(XO_4)$, where x=from 1 to 3, y=from 0 to 1, M1 and M2 are redox active transition metals (such as Ni, Co, and others such as Mn, Fe, V, Mo, etc.), X=P, Si, or As; Y=C or B; as well as many others) and various other intercalation-type active materials (such as other polyanions of triplite or other structures, etc.), high voltage spinels (including, but not limited to those with the formulas $LiMn_xNi_yM_zO_4$, where x is from 0.1 to 1.9, y is from 0.1 to 1.9, z is from 0 to 1, M is another transition metal or semimetal), to name a few common examples.

In some designs of cells with solid (and also with liquid) electrolytes, it may be advantageous to utilize aluminum (Al) or titanium (Ti) instead of carbon (or in addition to carbon) as a conductive additive material, particularly in combination with high voltage cathode materials because carbon may become oxidized, particularly at elevated temperatures and high potentials. Al, in contrast, may form a passivation layer (e.g., $AlF_3$ or $Al-O_x-F_y$) that prevents its oxidation. Ti may similarly form a passivating layer. In some designs, Ti or Al may be deposited within electrodes by a catalyst-assisted electroless plating method using a reducing agent (e.g., LiH or LiAlH$_4$). In some designs, Ti or Al may be deposited using a solution dipping (or solution spraying) method (e.g., using AlH$_3$\{O(C$_4$H$_9$)$_2$\} or Al\{O(C$_4$H$_9$)$_2$ or similar Al or Ti precursors\} or other organometallic precursors for Al or Ti), where the precursor decomposes (transforms) to Al (or Ti) and other products upon thermal treatment or by using a catalyst (e.g., titanium isopropoxide) or both. In some designs, Al-containing alloys or Ti-containing alloys or other metals and metal alloys resistant to oxidation at elevated potentials (e.g., greater than 4.5 V vs. Li/Li+) and temperatures (e.g., greater than around 150° C.) may be used instead of pure Al or pure Ti. In some designs, it may be advantageous to produce nanosized or nanostructured Al or Al alloy (or Ti or Ti alloy) films or particles— e.g., particles with average grain size or particle size in the range from 2 to 100 nm. The overall fraction of conductive metal (e.g., Al or Ti) additives in the electrode may range from around 0.02 wt. % to around 20 wt. % (not considering the metal in the current collector foil). In some designs, a metal (e.g., Al or Ti) mesh or metal (e.g., Al or Ti) foam may be used instead of a metal foil as a current collector.

When metal anodes (e.g., Li metal or Li alloy in the case of Li batteries, or Na metal (Na alloy) in the case of Na batteries, etc.) are used in combination with the solid electrolyte, the cell operation may induce formation of metal dendrites that propagate though the electrolyte during cycling and induce cell failure. In one aspect of the present disclosure, an interlayer may be placed between the solid electrolyte and metal (e.g., Li) anode. The suitable thickness of the interlayer may range from around 10 nm to around 10 microns. Such an interlayer should preferably wet well to the Li anode on one side and to a solid electrolyte on another side. It may be advantageous for the composition of such an interlayer to be substantially different than that of the solid electrolyte. This is because on the one hand, it may be advantageous to achieve a low charge-transfer resistance at the Li anode. Without an interlayer of different composition, this would require the solid electrolyte and Li to have a strong affinity for each other. In other words, the solid electrolyte/Li interface (interphase) energy should be low and the solid electrolyte should wet well on the Li surface. On the other hand, if the affinity of Li to the solid electrolyte is that high, it becomes almost inevitable that Li dendrites will eventually penetrate the solid electrolyte through grain boundaries or (even if the material is fully amorphous) through small cracks or defects within the solid electrolyte because maximizing a contact area between Li and the solid electrolyte composition becomes thermodynamically preferable. Therefore, to prevent dendrite penetration not only the elastic modulus of the SSE should likely be sufficiently high, but the interfacial energy between the bulk solid electrolyte and Li should be high as well. Unfortunately, this leads to very low rate performance of the cell. In contrast, the introduction of the interlayer allows one to simultaneously achieve low charge transfer resistance at the solid electrolyte/interlayer and interlayer/Li anode interfaces, while optimizing solid electrolyte composition to exhibit high interfacial energy at the electrolyte/Li anode interface.

The composition of such an interlayer should be carefully tuned to provide low interfacial resistance (at both Li and SSE sides) and good long-term stability. In some designs, it may be advantageous for this interlayer to be a composite. In some designs, such an interlayer may comprise carbon. In some designs, this carbon may be in the form of carbon nanotubes, carbon fibers, carbon (nano)fibers, graphite, graphite ribbons, carbon black, graphene, exfoliated graphite, porous carbon (including activated carbon or templated carbon), among other forms of conductive carbon. In some designs, such an interlayer may comprise transition metal(s). In some designs, metal(s) in the interlayer may be in the form of (nano)fibers, (nano)wires, (nano)flakes, (nano)particles, or (nano)porous metal (e.g., a foam or a mesh). In some designs, metals that exhibit very low solubility in Li at room temperature (e.g., less than 1%) may be advantageously utilized (e.g., Cu, Ti, Ni, and others). In some designs, such an interlayer may comprise oxides, sulfides or phosphides or halides of transition or rare earth metal(s) or lithium halides (e.g., LiI, LiF, LiCl, LiBr), lithium sulfide, lithium nitride, lithium phosphide or other lithium salts. In some designs, Li metal propagates into the portion of the interlayer on one side, while solid electrolyte propagates into the portion of the interlayer on another side. In some designs, the interlayer may comprise sub-layers. In some designs, such sub-layers may exhibit different surface chemistry or composition. In some designs, at least one of the sub-layers may be deposited on a Li anode prior to electrolyte infiltration.

In some designs of the solid cells with a Li metal anode, the temperature of the cell during a melt-infiltration may be above the melting point of Li. To prevent Li melting during melt infiltrating the cell with the molten electrolyte it may be advantageous to utilize Li alloys (which exhibit a melting point above that of the solid electrolyte) instead of pure Li. In some designs, a thin thermally-stable surface coating (e.g., composed of Li$_2$CO$_3$ with melting point of 723° C. or of other Li salt(s) with high melting temperatures) may be deposited on the Li foil to prevent Li from collapsing. This might appear counter-intuitive at first sight, but the inventors have experimentally observed that surface-treated Li foil may not change shape (melt) even at 600° C. The contact of the molten solid electrolyte with the Li surface layer may induce formation of a new Li-rich interphase with an even higher melting point (for reference, the melting point of Li$_2$O is 1438° C., Li$_2$S is 938° C., and LiF is 845° C.). In some designs, a Li metal anode may be embedded into a metal mesh or porous metal foam to further maintain its dimensions during heating to the solid electrolyte melt-infiltration temperature. In some designs, metal or carbon particles (including elongated fibers, wires, tubes, flakes, etc.) may be embedded into a Li metal anode to help maintain its dimensions and prevent leaking during heating. In some designs, melt-infiltration of the pre-heated thermally stable "jelly roll" or the multi-layered anode/separator/cathode stack with the solid electrolyte (similarly to infiltration of conventional cells with organic electrolyte) may be utilized for the cell construction.

Figure 10A:
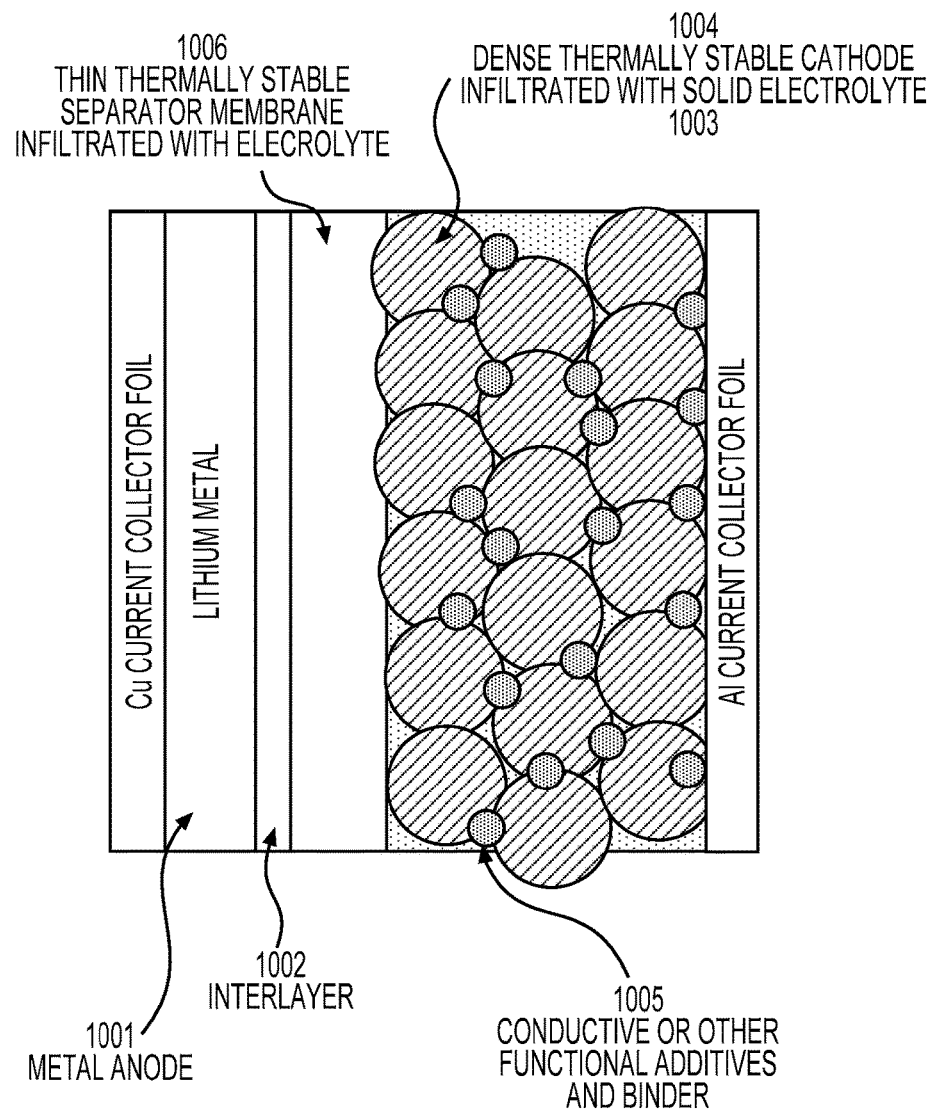
FIGS. 10A-10C illustrate example unit stacks (building blocks) of solid state batteries with melt-infiltrated solid electrolyte and metal anodes.
Figure 10B:
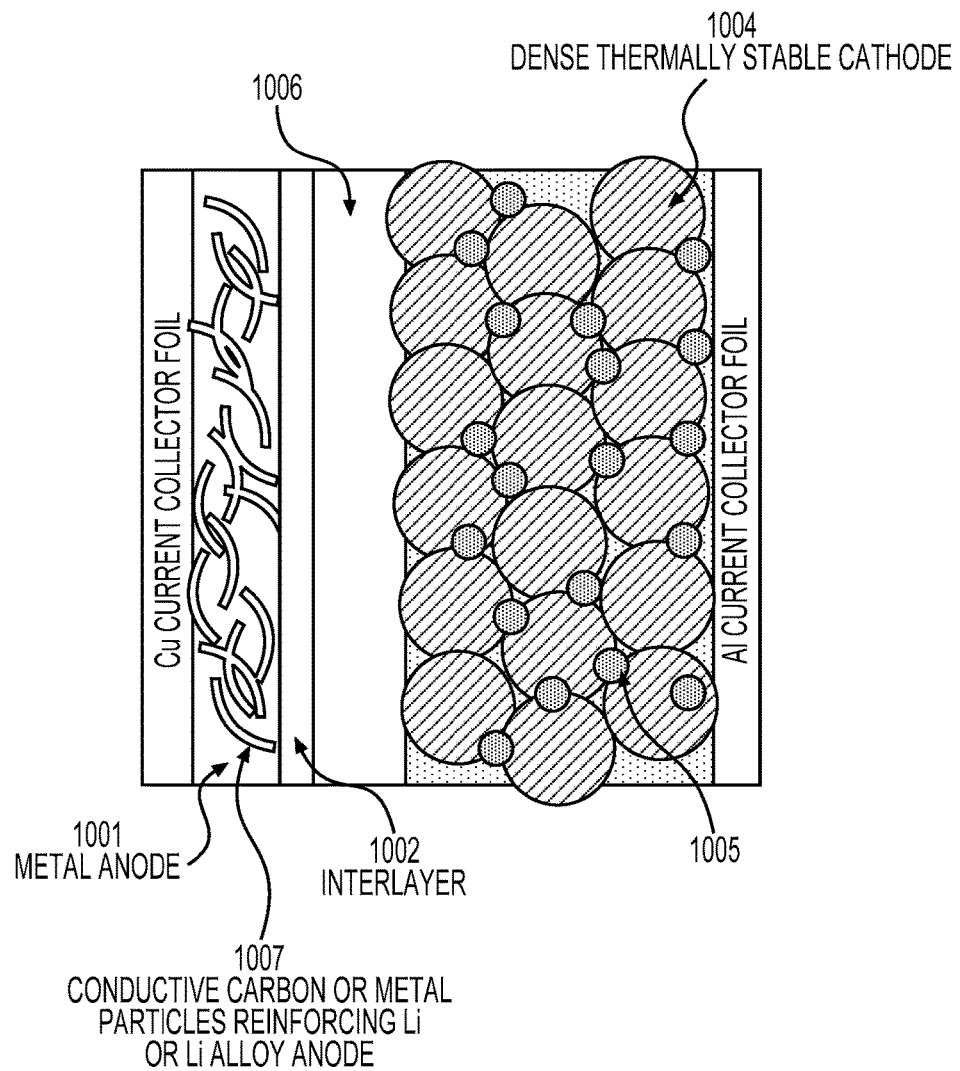
Figure 10C:
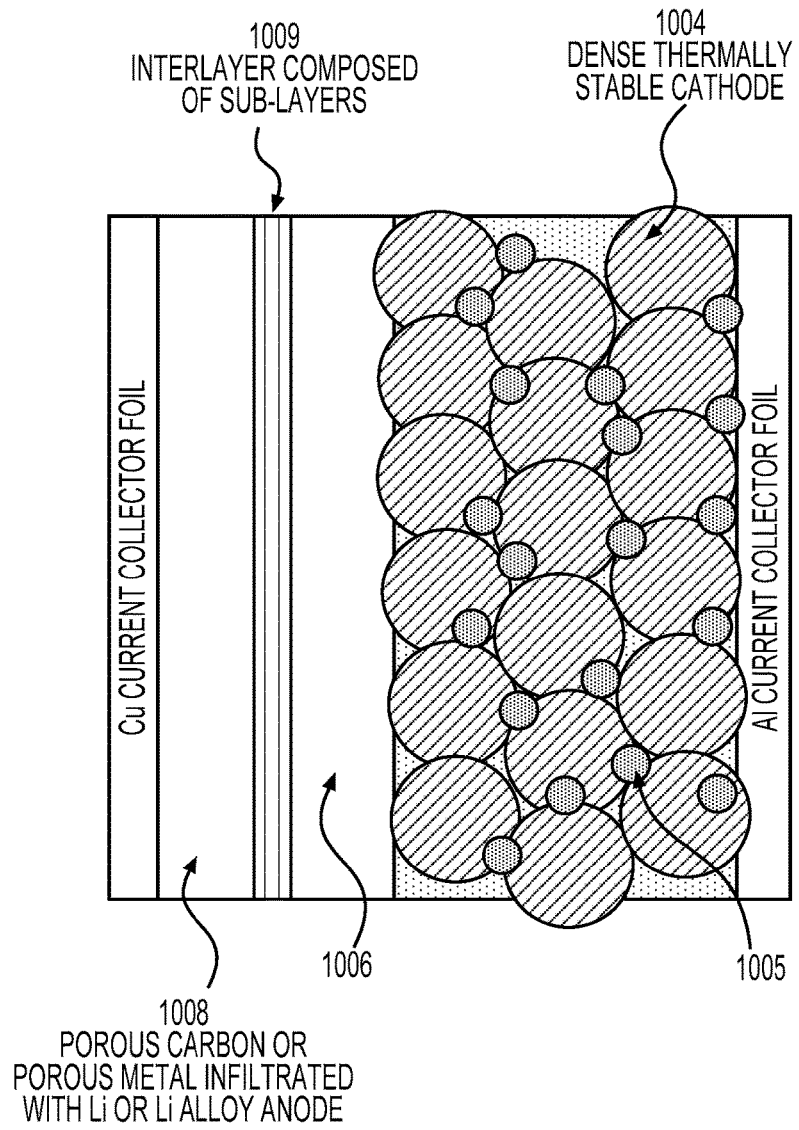

FIGS. 10A-10C show example embodiments of unit stacks including solid cells of the type disclosed herein with metal anodes (such as Li anodes). FIG. 10A shows an example unit stack comprising a Li metal or Li alloy anode 1001, an interlayer 1002 between the Li anode and the solid electrolyte 1003 (which provides low charge-transfer resistance and good cycling stability), a thermally stable cathode 1004 (comprising conductive and other functional additives 1005, including binder(s)) infiltrated with a solid electrolyte 1003, and a thermally stable separator membrane 1006 also infiltrated with a solid electrolyte 1003. FIG. 10B shows another example unit stack, similar to that of FIG. 10A, except that the Li or Li alloy anode 1001 comprises conductive metal or carbon additives 1007 (or other suitable additives) that reinforce the Li or Li alloy and improve its thermal stability (prevent substantial shape changes). FIG.

10C shows another example unit stack, similar again to that of FIG. 10A, except that (i) the Li is infiltrated into a suitable conductive porous metal (or carbon) mesh 1008 (or conductive thermally stable foam, fabric, or paper), which improves anode thermal stability (e.g., prevents substantial shape changes of the Li anode above the Li melting point) and does not undergo significant (e.g., greater than 1%) dissolution in Li; and (ii) the inter-layer 1009 between the anode and the electrolyte is composed of several distinguished sub-layers (e.g., of different composition or morphology, or both) for more favorable performance in cells.

The description is provided to enable any person skilled in the art to make or use embodiments of the present disclosure. It will be appreciated, however, that the present disclosure is not limited to the particular formulations, process steps, and materials disclosed herein, as various modifications to these embodiments will be readily apparent to those skilled in the art. That is, the generic principles defined herein may be applied to other embodiments without departing from the spirit or scope of the disclosure.

The invention claimed is:

1. A method of producing a Li or Li-ion or Na or Na-ion battery cell, comprising:

melting at least part of a solid electrolyte composition to produce a molten solid electrolyte composition, the melting comprising heating the at least part of the solid electrolyte composition to a temperature at least equal to a melting point of the solid electrolyte composition, the melting point being between 150°C. and 450°C.;

infiltrating the molten solid electrolyte composition into at least one of an anode electrode, a cathode electrode or a separator electrically separating the anode electrode and the cathode electrode; and cooling the infiltrated molten solid electrolyte composition so as to produce a melt-infiltration solid electrolyte composition disposed at least partially in the at least one of the anode electrode, the cathode or the separator, the melt-infiltration solid electrolyte composition being part of a solid electrolyte ionically coupling the anode electrode and the cathode electrode.

2. The method of claim 1, further comprising:

depositing, before the melting, the solid electrolyte composition on the at least one of the anode electrode, the cathode electrode or the separator, wherein the melting occurs in response to heat being applied to an assembly comprising a combination of (i) the deposited solid electrolyte composition and (ii) the at least one of the anode electrode, the cathode electrode or the separator, and wherein the infiltrating occurs as a result of the melting and the depositing.

3. The method of claim 1, wherein the melting occurs in response to heat being applied to the solid electrolyte composition without heating an assembly comprising the at least one of the anode electrode, the cathode electrode or the separator, and wherein the infiltrating includes dipping the assembly into the molten solid electrolyte.

* * * * *